United States Patent
Takeuchi

(10) Patent No.: US 7,906,925 B2
(45) Date of Patent: Mar. 15, 2011

(54) ELECTRIC MOTOR, DRIVE SYSTEM EMPLOYING MULTIPLE ELECTRIC MOTORS, AND METHOD FOR CONTROLLING THE SAME

(75) Inventor: Kesatoshi Takeuchi, Shioziri (JP)

(73) Assignee: Seiko Epson Corporation (JP)

( * ) Notice: Subject to any disclaimer, the term of this patent is extended or adjusted under 35 U.S.C. 154(b) by 318 days.

(21) Appl. No.: 12/226,833

(22) PCT Filed: Jun. 7, 2007

(86) PCT No.: PCT/JP2007/061953
§ 371 (c)(1),
(2), (4) Date: Oct. 29, 2008

(87) PCT Pub. No.: WO2008/007510
PCT Pub. Date: Jan. 17, 2008

(65) Prior Publication Data
US 2009/0079372 A1  Mar. 26, 2009

(30) Foreign Application Priority Data

Jul. 10, 2006 (JP) ................................ 2006-189238
Jul. 13, 2006 (JP) ................................ 2006-192493

(51) Int. Cl.
*H02P 6/16* (2006.01)
(52) U.S. Cl. .................. 318/400.38; 318/687; 318/34; 310/68 B
(58) Field of Classification Search .......... 318/34, 318/51, 135, 687, 400.04, 400.17, 400.38; 310/12.21, 12.24, 68 B, 181
See application file for complete search history.

(56) References Cited

U.S. PATENT DOCUMENTS

| | | |
|---|---|---|
| 5,991,355 A | 11/1999 | Dahlke |
| 7,095,155 B2 | 8/2006 | Takeuchi |
| 7,211,974 B2 | 5/2007 | Takeuchi |
| 2005/0258986 A1* | 11/2005 | Hare et al. .................... 341/50 |
| 2007/0188121 A1 | 8/2007 | Takeuchi |
| 2009/0039809 A1* | 2/2009 | Takeuchi ............... 318/400.09 |
| 2009/0195202 A1* | 8/2009 | Takeuchi ............... 318/400.37 |
| 2009/0218163 A1* | 9/2009 | Takeuchi et al. ............ 180/446 |

(Continued)

FOREIGN PATENT DOCUMENTS

GB   2 351 162 A   12/2000

(Continued)

*Primary Examiner* — Bentsu Ro
*Assistant Examiner* — Eduardo Colon-Santana
(74) *Attorney, Agent, or Firm* — Harness, Dickey & Pierce, P.L.C.

(57) ABSTRACT

The motor according to one aspect of the present invention has an output waveform correcting unit for correcting the waveform of the output signal of a magnetic sensor during operation of the electric motor. ID codes for identification purposes are assigned respectively to a plurality of magnetic sensors. The output waveform correcting unit receives, from an external device, output waveform correction values for the magnetic sensors together with the ID codes, and stores the output waveform correction values for the magnetic sensors in memory. The drive system according to another aspect of the present invention has a plurality of electric motors, and a system controller connected to the plurality of motors via a shared communication line. Each electric motor has an identification code register that stores an identification code for identifying each electric motor. The system controller has an individual control mode in which operation of individual motors is controlled by transmitting commands to individual electric motors together with identification codes via the shared communication line.

24 Claims, 39 Drawing Sheets

U.S. PATENT DOCUMENTS

2009/0295318 A1    12/2009    Takeuchi

FOREIGN PATENT DOCUMENTS

| | | |
|---|---|---|
| JP | 54-129417 | 10/1979 |
| JP | 05-137183 | 6/1993 |
| JP | 05 137183 A | 6/1993 |
| JP | 09 149675 A | 6/1997 |
| JP | 11-099131 | 4/1999 |
| JP | 2000-295894 | 10/2000 |
| JP | 2000 295894 A | 10/2000 |
| JP | 2001 298982 A | 10/2001 |
| JP | 2002 315374 A | 10/2002 |
| JP | 2003 111483 A | 4/2003 |
| JP | 2005-110363 | 4/2005 |
| JP | 2005-261135 | 9/2005 |
| JP | 2005 295721 A | 10/2005 |

* cited by examiner

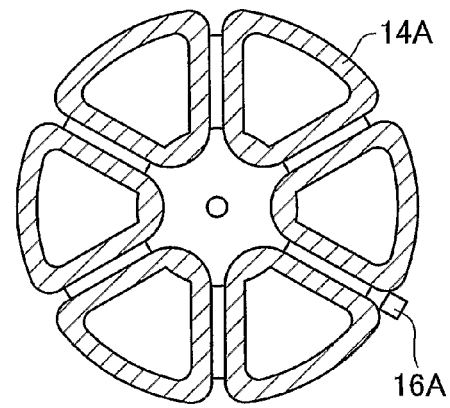
Fig.1B
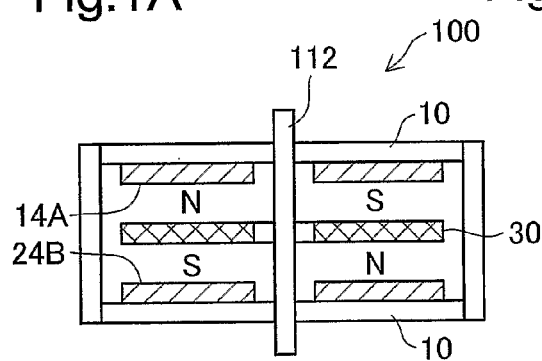
Fig.1A Fig.1C
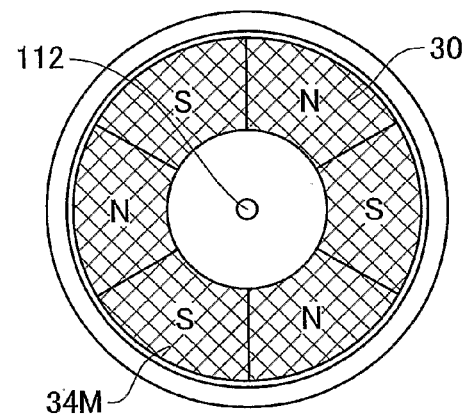
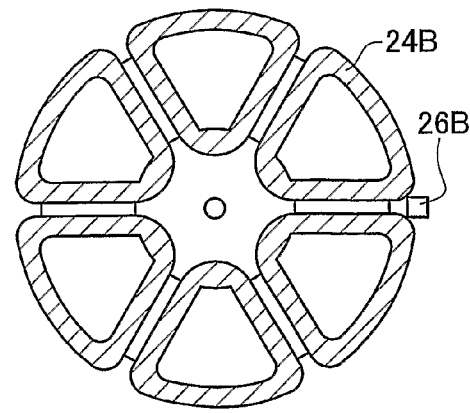
Fig.1D

AC drive signal

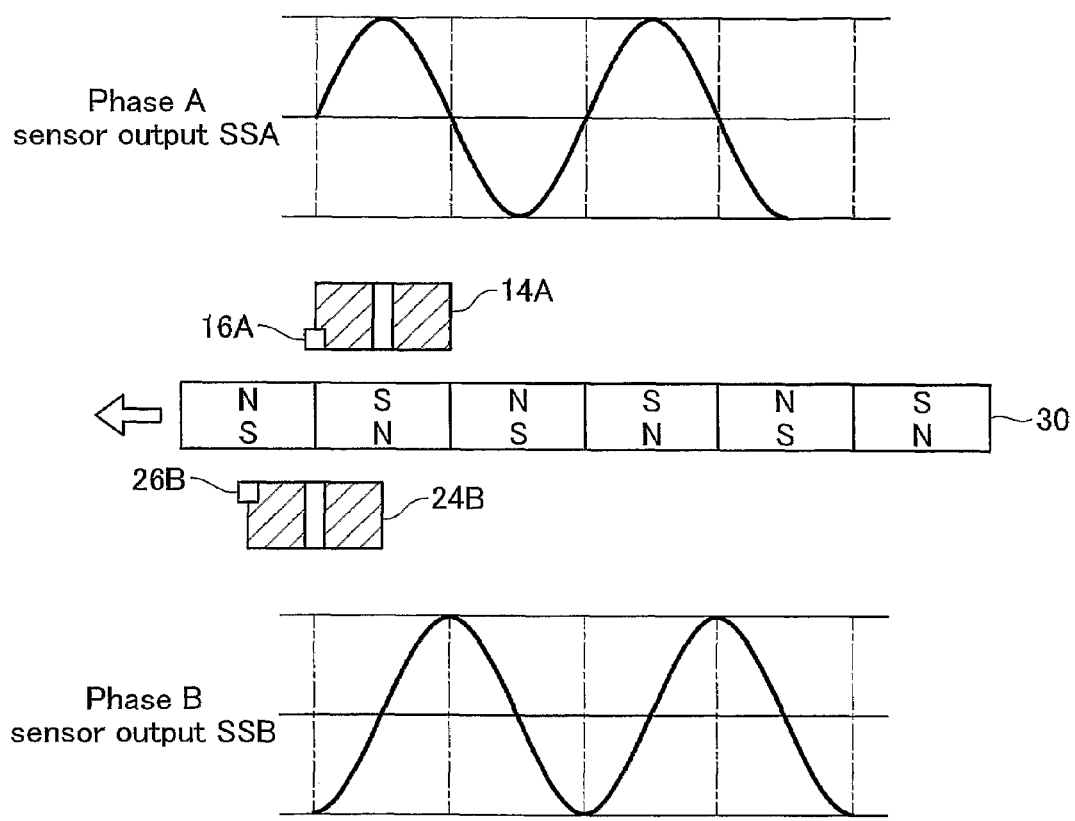

Phase = just prior to 2π (Phase A reverses polarity at 2π)

Phase = π/4

Phase = just prior to π/2 (Phase B reverses polarity at π/2)

Phase = 3π/4

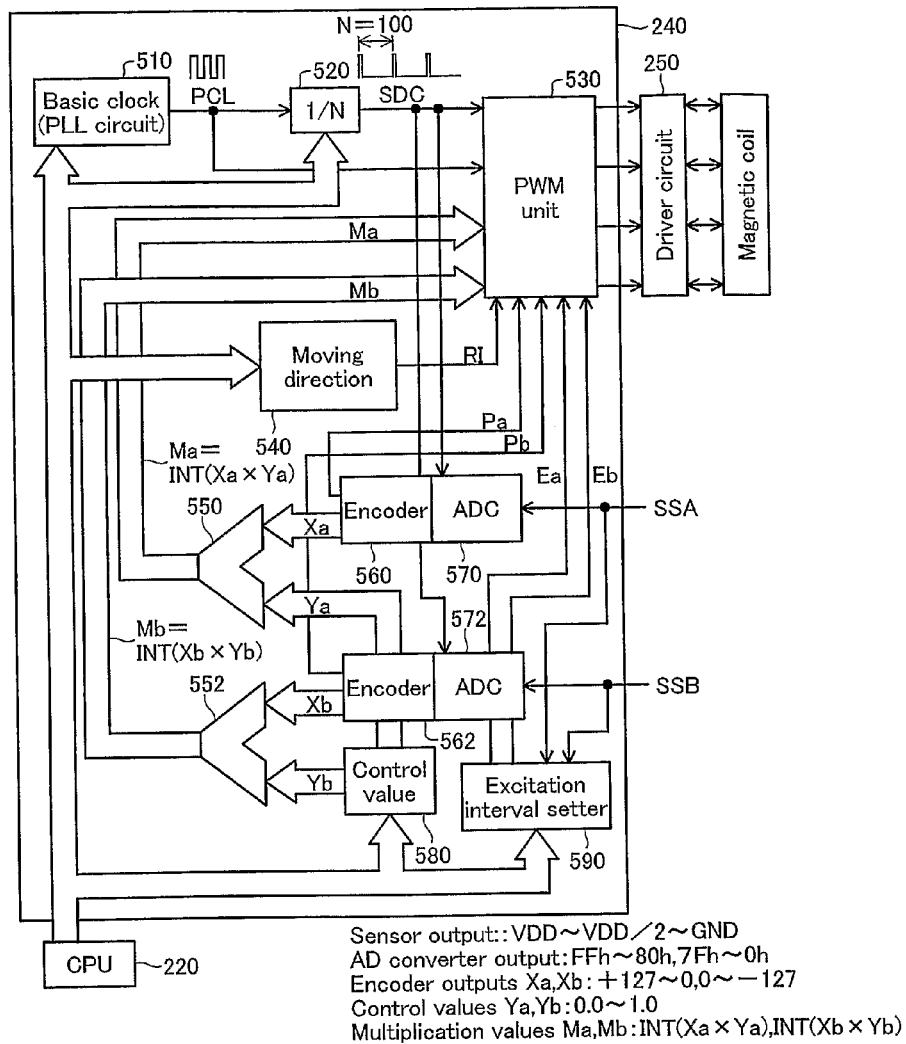

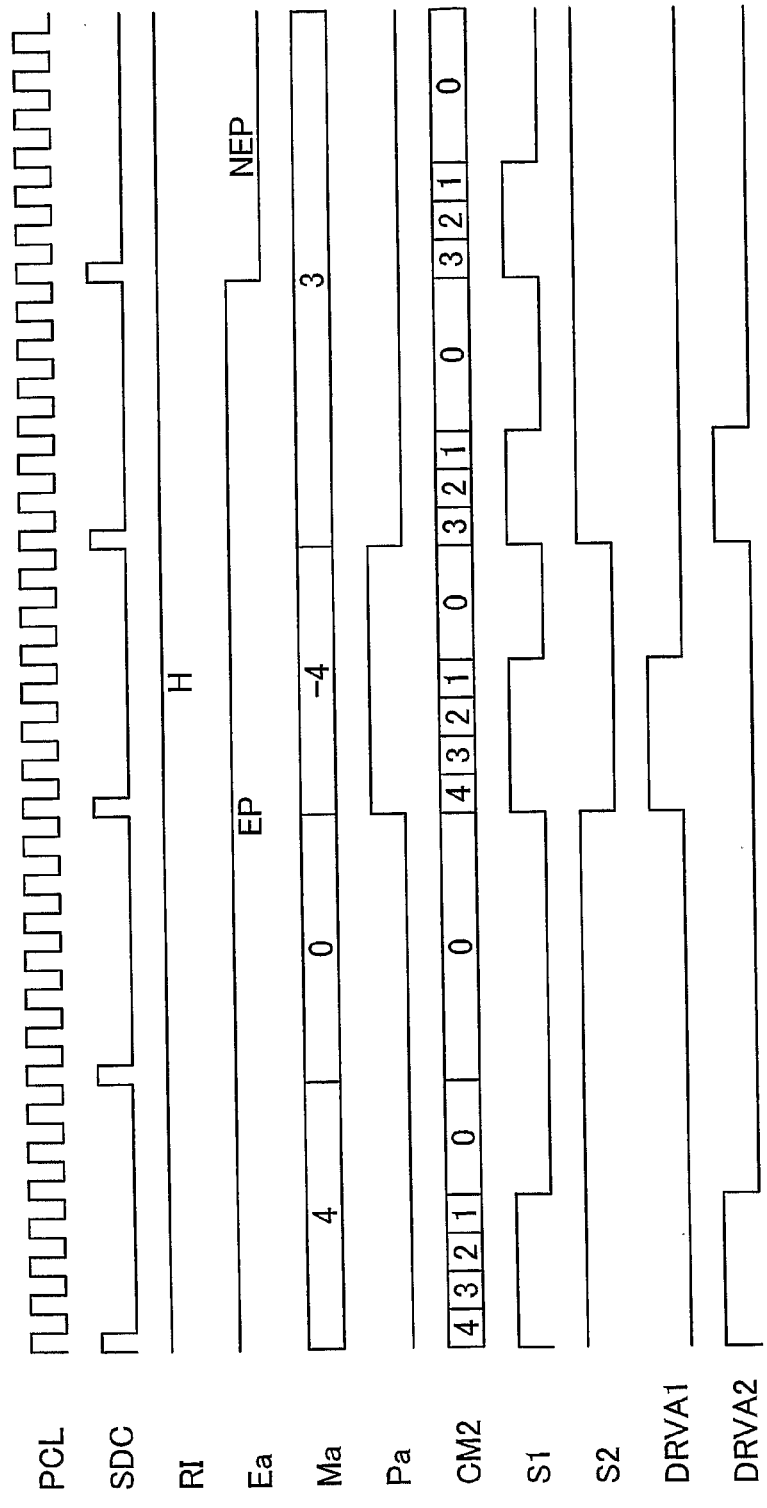
Fig.14 During reverse rotation (RI="H")

Desired sensor output

Vertical offset Poffset1 for use in sensor output correction

Sideways offset Poffset2 for use in sensor output correction

Desired sensor output

Pgain1 for use in sensor output correction $\geq 1$

Pgain1 for use in sensor output correction $\leq 1$

Fig.34A

Simultaneous control sequence example 1

| Electric motor ID | Simultaneous control sequence (command step STEDN) | | | | |
|---|---|---|---|---|---|
| | 0 | 1 | 2 | .. | N |
| 1 | reverse rotation | —(maintain) | speed instruction | .. | forward rotation |
| 2 | forward rotation | braking (regeneration) | stop | .. | stop |
| 3 | —(stop) | forward rotation | —(maintain) | .. | stop |
| : | : | : | : | .. | : |
| M | —(stop) | braking (regeneration) | speed instruction | .. | reverse rotation |

Fig.34B

Simultaneous control sequence example 2

| Electric motor ID | Simultaneous control sequence (command step STEDN) | | | | |
|---|---|---|---|---|---|
| | 0 | 1 | 2 | 3 | N |
| 1 | forward rotation | speed instruction | braking (regeneration) | stop | — |
| 2 | forward rotation | speed instruction | braking (regeneration) | stop | — |
| 3 | forward rotation | speed instruction | braking (regeneration) | stop | — |
| : | : | : | : | : | : |
| M | forward rotation | speed instruction | braking (regeneration) | stop | — |

ELECTRIC MOTOR, DRIVE SYSTEM EMPLOYING MULTIPLE ELECTRIC MOTORS, AND METHOD FOR CONTROLLING THE SAME

TECHNICAL FIELD

The present invention relates to an electric motor that utilizes permanent magnets and magnet coils, to a drive system employing multiple electric motors, and to a method for control the same.

BACKGROUND ART

Electric motors that utilize permanent magnets and magnet coils are known, having been disclosed in JP2001-298982A and JP2003-111483A, for example.

In the prior art electric motors, motor control is carried out using an on/off signal from a digital magnetic sensor. Specifically, the timing for reversing the polarity of the voltage applied to the magnet coil is determined using the on/off signal from the digital magnetic sensor.

Magnetic sensors having analog output (so-called analog magnetic sensors) are also available. However, where an analog magnetic sensor is used to control a motor, considerable error in sensor output can occur due to manufacturing errors of various kinds among motors, making it impossible in some instances to carry out motor control satisfactorily. Examples of manufacturing errors among motors that can have an effect on output of an analog magnetic sensor are error in the installation location of the magnetic sensor; error in the location of the N pole/S pole boundary due to magnetization error of the permanent magnet; and error in mounting location of elements inside the magnetic sensor. However, to date there have yet to be devised satisfactory technology for achieving accurate motor control using analog magnetic sensors, while taking such errors into consideration. This problem is not limited to cases where analog magnetic sensors are used; the problem is encountered also in cases where digital magnetic sensors having multi-value analog output are used.

Incidentally, drive systems employing multiple electric motors have been implemented in robots, mobile objects (e.g. vehicles), and the like.

However, in the past it was necessary to provide a large number of control lines between the individual electric motors and the overall system controller for the purpose of controlling the multiple electric motors.

DISCLOSURE OF THE INVENTION

A first object of the present invention is to provide technology for achieving accurate motor control, while taking into account errors relating to magnetic sensor output.

A second object of the present invention is to provide technology for simplifying the configuration and control procedure of a drive system employing multiple electric motors.

According to an aspect of the present invention, there is provided an electric motor comprising: a coil array having a plurality of magnetic coils; a magnet array having a plurality of permanent magnets; a plurality of magnetic sensors each outputting an output signal that changes in analog fashion depending on relative location of the magnet array and the coil array; a drive control circuit that, utilizing analog change in the output signals of the plurality of magnetic sensors, generates application voltage for application to the coil array; and an output waveform correcting unit configured to respectively correct waveforms of the output signals of the plurality of magnetic sensors such that the output signals of the magnetic sensors assume a prescribed waveform shape during operation of the electric motors. The output waveform correcting unit has a memory for storing output waveform correction values. ID codes are assigned respectively to the plurality of magnetic sensors. The output waveform correcting unit receives from an external device an output waveform correction value for each magnetic sensor, together with the ID code for each magnetic sensor, and stores the output waveform correction value for each magnetic sensor in the memory.

This electric motor is furnished with an output waveform correcting unit for performing correction of the output signal of the magnetic sensor so as to give a waveform of prescribed shape, and thus the drive control circuit, utilizing analog change in the output signal of the magnetic sensor, can apply application voltage of preferred waveform to the coil array. As a result, it will be possible to achieve accurate motor control even if the output of the magnetic sensor includes errors. Moreover, since the plurality of magnetic sensors are identified to one another by ID codes, and receive output waveform correction values from the external device together with the ID codes, the output signals of the plurality of magnetic sensors can be respectively corrected to their desired waveforms.

The output waveform correcting unit may execute gain correction and offset correction of the output signal of each magnetic sensor.

The gain correction and offset correction will easily correct the output signal of the magnetic sensor to the desired waveform shape.

The memory of the output waveform correcting unit may include a nonvolatile memory for storing gain correction values and offset correction values as the output waveform correction values.

With this arrangement, once a gain correction value and an offset correction value have been established, it becomes possible to obtain the desired sensor output at any time.

The electric motor may further comprises a communication unit configured to exchange the output waveform correction values and the ID codes of the magnetic sensors with the external device.

With this arrangement, correction values can be transmitted to the motor from the external device and stored when the electric motor is manufactured, for example.

According to another aspect of the present invention, a drive system comprises: a plurality of electric motors each including a drive control circuit; and a system controller coupled to the plurality of electric motors via a shared communication line. The drive control circuit of each electric motor has an identification code register that stores an identification code to identify each electric motor. The system controller has an individual control mode in which operation of an individual electric motor is controlled by transmitting a command to the individual electric motor together with the identification code via the shared communication line.

According to this drive system, in the individual control mode, the system controller controls operation of individual electric motors by sending commands, together with identification codes, to the individual electric motors via a communications line, thus eliminating the need to provide a large number of control lines and making it possible to simplify system configuration.

The system controller may further have a simultaneous control mode for simultaneously controlling operation of the plurality of electric motors, by transmitting via the shared communication line a shared command that is shared by the plurality of electric motors.

With this configuration, it is possible to simultaneously operate multiple electric motors in the simultaneous control mode, and thus multiple electric motors can be operated in coordination under the same timing.

The system controller may, when transmitting the shared command to the plurality of electric motors, transmit the shared command without transmitting the identification codes.

With this configuration, operation of multiple electric motors can be controlled simultaneously, while simplifying transmission of shared commands.

The system controller may be capable of transmitting commands to individual electric motors together with the identification codes via the shared communication line prior to transmitting the shared command, thereby establishing in the drive control circuit of the individual electric motors a simultaneous control sequence composed of a plurality of control steps arranged in a time sequence. Each electric motor may update or increment the control step of the simultaneous control sequence each time that the shared command is received from the system controller, and executes operation according to the updated control step.

With this configuration, it is possible to simultaneously modify the operational status of multiple electric motors, according to a simultaneous control sequence pre-established for each electric motor.

Mutually different sequences may be established in the plurality of electric motors as the simultaneous control sequence.

With this configuration, control sequences that are respectively appropriate for individual electric motors can be established.

The communication line may be a serial communication line that transmits addresses and commands over the same data line. The identification codes of the electric motors may be associated on a one-to-one basis with addresses of the electric motors transmitted by the system controller via the communication line, whereby the addresses of the electric motors function as identification codes of the electric motors.

With this configuration, commands can be sent to individual electric motors with a smaller number of lines.

The system controller may be capable of acquiring operational parameters or settings from individual electric motors via the communication line.

With this configuration, it is possible for the system controller to verify operational status and settings status of individual electric motors.

It is possible for the present invention to be reduced to practice in various ways, for example, an electric motor, a method and circuit for controlling the same; a method and device for correcting an electric motor sensor; an actuator, an electronic device, and an electric appliance employing these; a drive system and method for controlling the same; a computer program for this purpose, and so on.

BRIEF DESCRIPTION OF THE DRAWINGS

FIGS. 1A through 1D are sectional views showing the configuration of the motor unit of an electric motor in Embodiment 1;

FIG. 3 illustrates magnetic sensor waveforms;

FIGS. 10A through 10E show the internal configuration and operation of a PWM controller;

FIG. 14 is a timing chart depicting operation of the PWM unit during reverse rotation of the motor;

FIGS. 34A and 34B show exemplary simultaneous control sequences;

BEST MODE FOR CARRYING OUT THE INVENTION

The embodiments of the present invention will be discussed in the order indicated below.
1. Embodiment 1
   1-A. Configuration of Electric Motor
   1-B. Configuration of Drive Control Circuit
   1-C. Correction of Sensor Output
   1-D. Modification Example of Drive Control Circuit
   1-E. Other Procedure for Implementing Sensor Output Correction
2. Embodiment 2
3. Other Modification Examples

1. Embodiment 1

1-A. Configuration of Electric Motor

FIG. 1A is a sectional view showing the configuration of the motor unit of an electric motor in one embodiment of the present invention. This motor unit 100 has a stator unit 10 and a rotor unit 30, each of generally disk shape. The rotor unit 30 has a magnet array 34M composed of a number of magnets, and is affixed to a rotating shaft 112. The direction of magnetization of the magnet array 34M is the vertical direction. The stator unit 10 has a Phase A coil array 14A positioned above the rotor unit 30, and a Phase B coil array 24B positioned below the rotor unit 30.

FIGS. 1B to 1D depict, in detached form, the first coil array 14A of the stator unit 10, the rotor unit 30, and the second coil array 24B of the stator unit 10, respectively. In this example, the Phase A coil array 14A and the Phase B coil array 24B each have six coils; likewise, the magnet array 34M has six magnets. However, it is possible to set the number of coils and magnets to any value.

Figure 2A:
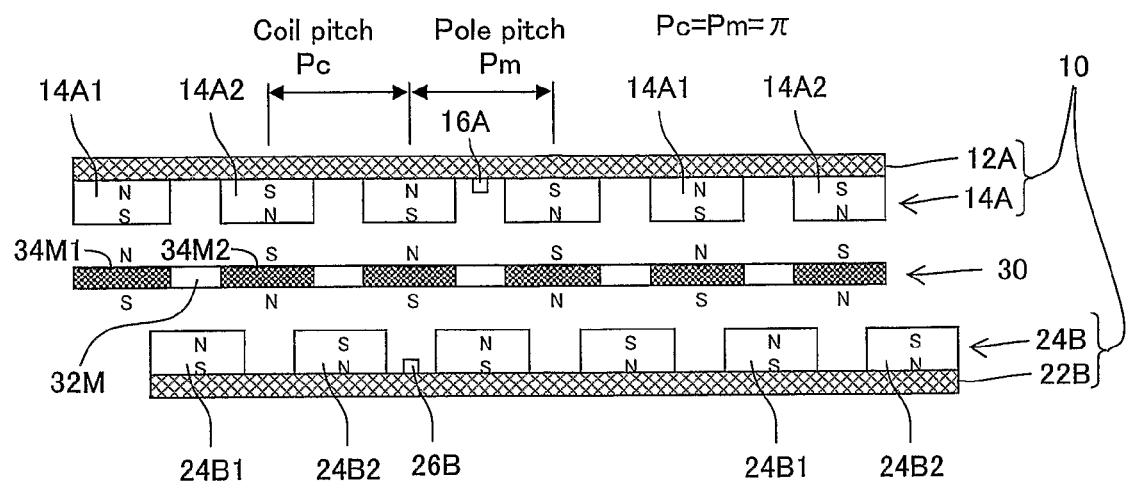
FIGS. 2A and 2B illustrate the positional relationship of coil arrays and a magnet array in Embodiment 1.

FIG. 2A depicts the positional relationship of coil arrays 14A, 24B and the magnet array 34M. The Phase A coil array 14A is affixed to a support member 12A, while the Phase B coil array 24B is affixed to a support member 22B. The Phase A coil array 14A includes two types of coils 14A1, 14A2 excited in opposite directions and arranged in alternating fashion at a constant pitch Pc. In the state shown in FIG. 2A, the three coils 14A1 are excited such that their direction of magnetization (the direction from the N pole to the S pole) is oriented downward; the other three coils 14A2 are excited such that their direction of magnetization is oriented upward. Likewise, the Phase B coil array 24B is composed of two types of coils 24B1, 24B2 excited in opposite directions and arranged in alternating fashion at the constant pitch Pc. Herein, "coil pitch Pc" is defined as the pitch of the coils of the Phase A coil array, or the pitch of the coils of the Phase B coil array.

The magnet array 34M of the rotor unit 30 is affixed to a support member 32M. The permanent magnets of this magnet array 34M are oriented respectively with their direction of magnetization facing in the direction perpendicular to the direction of placement of the magnet array 34M; the latter is the left-right direction in FIG. 2A. The magnets of the magnet array 34M are arranged at constant magnetic pole pitch Pm. In this example, the magnetic pole pitch Pm is equal to the coil pitch Pc, and in terms of electrical angle is equivalent to $\pi$. Electrical angle of $2\pi$ is associated with the mechanical angle or distance when the phase of the drive signal presented to the coil array changes by $2\pi$. In the present embodiment, when the phase of the drive signals of the Phase A coil array 14A and the Phase B coil array 24B changes by $2\pi$, the magnet array 34M undergoes displacement by the equivalent of twice the coil pitch Pc.

The Phase A coil array 14A and the Phase B coil array 24B are positioned at locations differing from one another by $\pi/2$ in terms of electrical angle. The Phase A coil array 14A and the Phase B coil array 24B differ only in location, and in other respects have substantially identical configuration. Consequently, only the example of the Phase A coil array 14A will be discussed below, except where there is a particular need during discussion of the coil array.

Figure 2B:
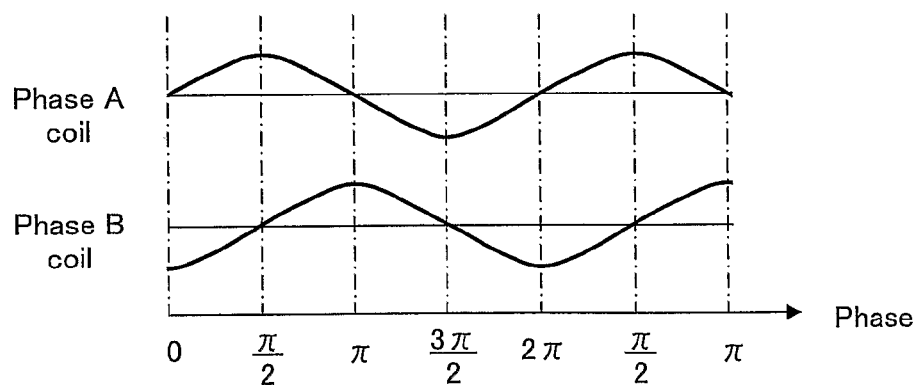

FIG. 2B depicts exemplary waveforms of AC drive signals presented to the Phase A coil array 14A and the Phase B coil array 24B. The Phase A coil array 14A and the Phase B coil array 24B are presented respectively with two-phase AC signals. The drive signals of the Phase A coil array 14A and the Phase B coil array 24B are phase-shifted by $\pi/2$ with respect to one another. The state of FIG. 2A corresponds to the zero phase or $2\pi$ state.

As shown in FIG. 2A, the motor unit 100 additionally has an analog magnetic sensor 16A for the Phase A coil array 14A, and an analog magnetic sensor 16B for the Phase B coil array 24B. Hereinafter these will be termed the "Phase A sensor" and the "Phase B sensor." The Phase A sensor 16A is situated at a location in the center between the two coils of the Phase A coil array 14A; the Phase B sensor 26B is situated at a location in the center between the two coils of the Phase B coil array 24B. In the present embodiment, the AC drive signals depicted in FIG. 2B are generated utilizing the analog output of these sensors 16A, 26B. Hall ICs that utilize the Hall effect can be employed as the sensors 16A, 26B, for example.

FIG. 3 is an illustration depicting magnetic sensor waveforms. In this example, the Phase A sensor output SSA and the Phase B sensor output SSB are both sine waves. These sensor outputs have waveform shape substantially identical to that of back electromagnetic force of the Phase A coil 14A and the Phase B coil 24B. The back electromagnetic force waveform is dependent on the shape of the coils and the positional relationship of the magnets and the coils, but is typically a sine wave or a shape very close to a sine wave. The "back electromagnetic force" may be also referred to as "induced voltage."

In general, an electric motor functions as an energy conversion device that converts between mechanical energy and electrical energy. The back electromagnetic force of the coils represents mechanical energy of the motor converted to electrical energy. Consequently, where electrical energy applied to the coils is converted to mechanical energy (that is, where the motor is driven), it is possible to drive the motor with maximum efficiency by means of application of voltage having waveform identical to that of the back electromagnetic force. As will be discussed below, "voltage having waveform identical to that of the back electromagnetic force" means voltage that generates current in the opposite direction to the back electromagnetic force.

Figure 4:
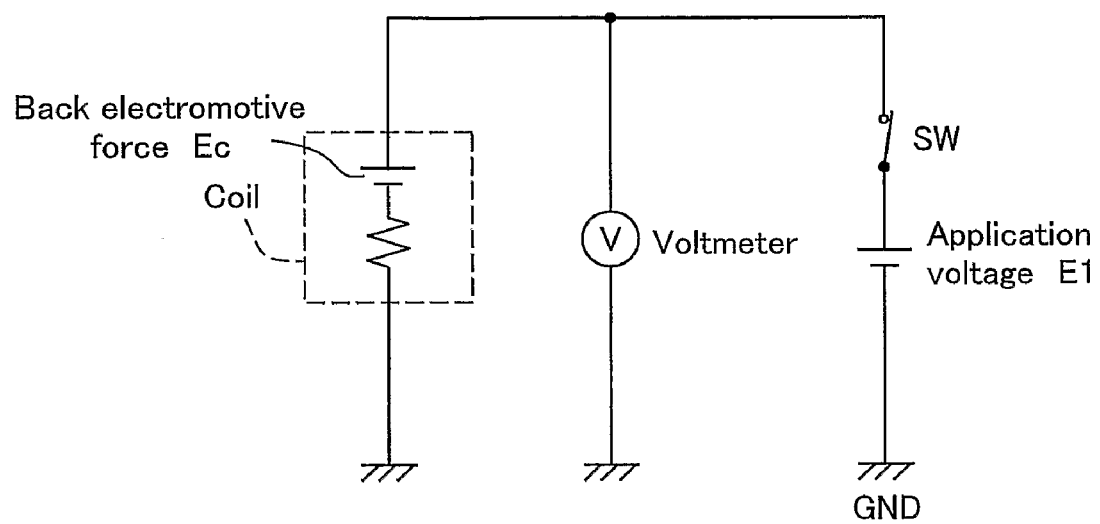
FIG. 4 is a schematic diagram depicting the relationship of coil application voltage and back electromotive force.

FIG. 4 is a schematic diagram depicting the relationship of coil application voltage and back electromotive force. Here, the coil is simulated in terms of back electromotive force Ec and resistance. In this circuit, a voltmeter V is parallel-connected to the application voltage E1 and the coil. When voltage E1 is applied to the motor to drive the motor, back electromotive force Ec is generated in the direction of reverse current flow to the application voltage E1. When a switch SW is opened while the motor is rotating, the back electromotive force Ec can be measured with the voltmeter V. The polarity of the back electromotive force Ex measured with the switch SW open will be the same as the polarity of the application voltage E1 measured with the switch SW closed. The phrase "application of voltage of waveform identical to that of the back electromagnetic force" hereinabove refers to application of voltage having the same polarity and waveform as the back electromotive force Ec measured by the voltmeter V.

As noted previously, when driving a motor, it is possible to drive the motor with maximum efficiency by means of application of voltage having waveform identical to that of the back electromagnetic force. It can be appreciated that energy conversion efficiency is relatively low in proximity to the middle point of the sinusoidal back electromotive force waveform (in proximity to 0 voltage), and conversely that energy conversion efficiency is relatively high in proximity to the peak of the back electromotive force waveform. Where the motor is driven by applying voltage of the same waveform as the back electromotive force, relatively high voltage will be applied during periods of relatively high energy conversion efficiency, thus improving efficiency of the motor. On the other hand, if the motor is driven with a simple rectangular waveform, considerable voltage will be applied in proximity to a location where back electromotive force is substantially 0 (at the middle point of its waveform), and efficiency of the motor will be lower. Also, the problem of vibration and noise occurring will arise when voltage is applied during such periods of low energy conversion efficiency.

As will be understood from the preceding discussion, advantages of driving a motor through application of voltage having the same waveform as back electromotive force are that efficiency of the motor will be improved, and that vibration and noise will be reduced.

Figure 5A:
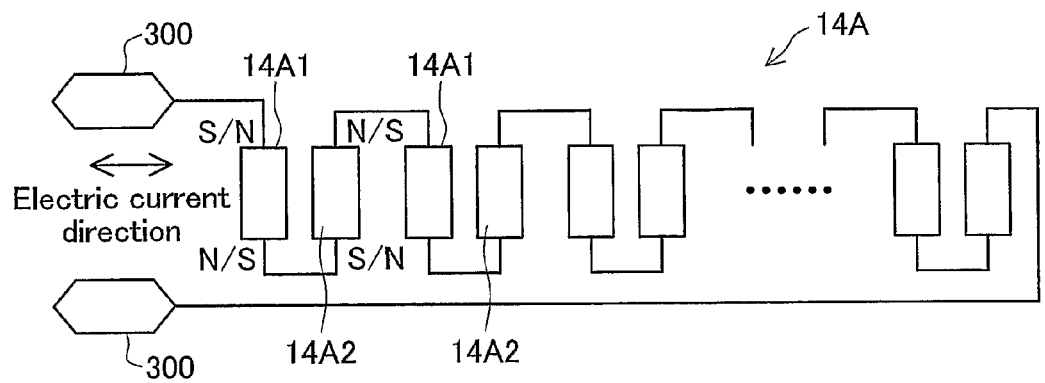
FIGS. 5A and 5B illustrate coil connecting methods.
Figure 5B:
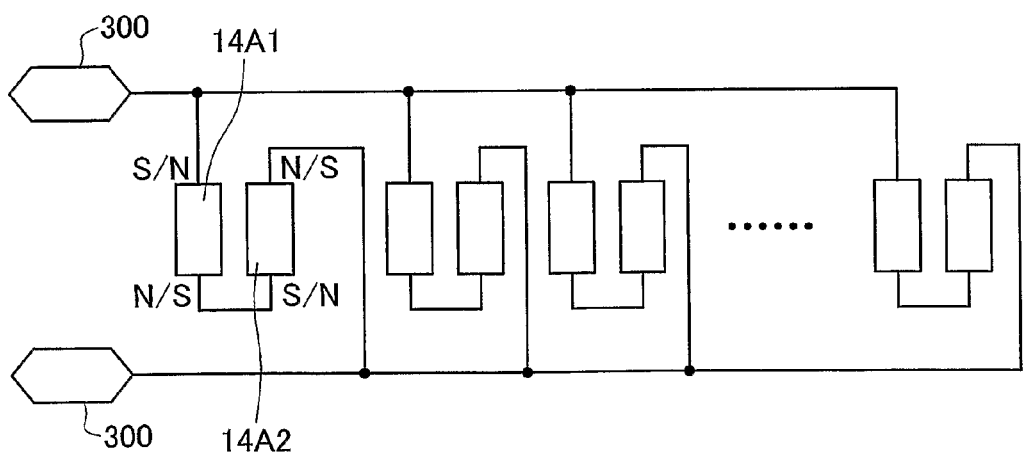

FIGS. 5A and 5B are diagrams depicting connection methods of the two types of coils 14A1, 12A2 of the Phase A coil array A1. With the connection method of FIG. 5A, all of the coils included in the Phase A coil array A1 are series-connected to drive control circuits 300. With the connection method of FIG. 5B, on the other hand, a plurality of series-connected pairs of coils 14A1, 12A2 are connected in parallel. With either connection method, the two types of coils 14A1, 12A2 will always be magnetized with opposite polarity.

FIGS. 6A to 6D depict operation of the electric motor of the present embodiment. In this example, rightward displacement of the magnet array 34M with respect to the coil arrays 14A, 24B over time is depicted. The left-right direction in the drawings can be understood to correspond to the rotation direction of the rotor unit 30 shown in FIG. 1A.

Figure 6A:
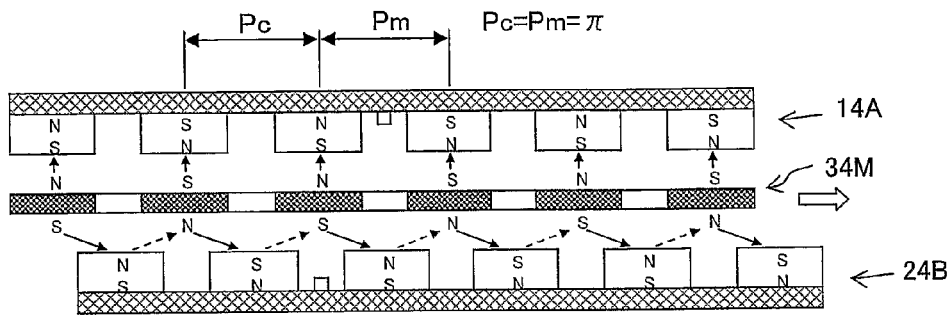
FIGS. 6A through 6D illustrate the basic principle of electric motor operation in Embodiment 1.

FIG. 6A depicts the state at the timing when the phase is just prior to $2\pi$. The solid arrows drawn between coils and magnets denote the attraction direction, and the broken arrows denote the repulsion direction. In this state, the Phase A coil array 14A does not impart driving force in the operating direction (left-right direction in the drawing) to the magnet array 34M, and magnetic force acts in the direction drawing the magnet array 34M towards the Phase A coil array 14A. Consequently, application voltage to the Phase A coil array 14A will preferably go to zero at the timing coincident with the phase of $2\pi$. On the other hand, the Phase B coil array 24B does impart driving force in the operating direction to the magnet array 34M. Moreover, since the Phase B coil array 24B imparts not only attracting force but also repelling force to the magnet array 34M, zero net force is applied in the vertical direction (direction perpendicular to the operating direction of the magnet array 34M) to the magnet array 34M by the Phase B coil array 24B. Consequently, application voltage to the Phase B coil array 24B will preferably go to peak value at the timing coincident with the phase of $2\pi$.

Figure 6B:
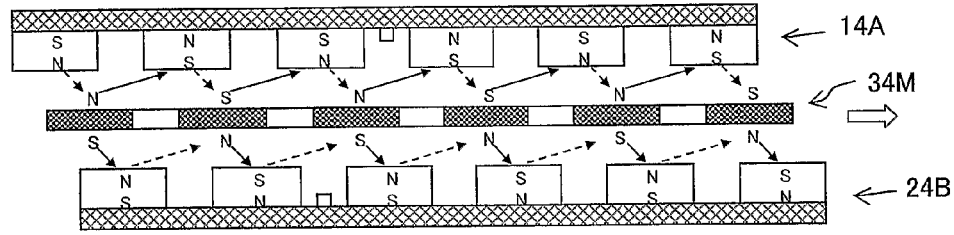
Figure 6C:
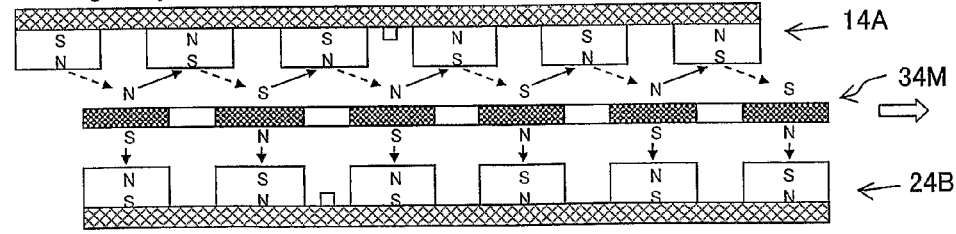
Figure 6D:
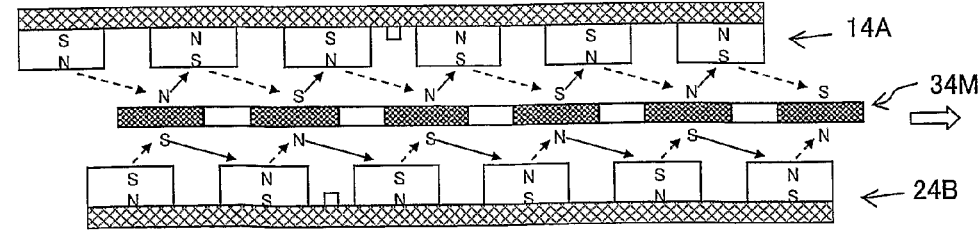

As shown in FIG. 6B, the Phase A coil array 14A reverses polarity at the timing coincident with the phase of $2\pi$. FIG. 6B depicts the state where the phase is $\pi/4$; polarity of the Phase A coil array 14A is now the reverse of that in FIG. 6A. In this state, both the Phase A coil array 14A and the Phase B coil array 24B impart identical driving force in the operating direction to the magnet array 34M. FIG. 6C depicts the state where the phase is just prior to $\pi/2$. In this state, which is the opposite of the state of FIG. 6A, only the Phase A coil array 14A imparts driving force in the operating direction to the magnet array 34M. At the timing coincident with the phase of $\pi/2$. the polarity of the Phase B coil array 24B reverses, producing the polarity depicted in FIG. 6D. FIG. 6D depicts the state where the phase is $3\pi/4$. In this state, both the Phase A coil array 14A and the Phase B coil array 24B impart identical driving force in the operating direction to the magnet array 34M.

As will be understood from FIGS. 6A to 6D, polarity of the Phase A coil array 14A switches at the timing when the coils of the Phase A coil array 14A are situated in opposition to the magnets of the magnet array 34M. The Phase B coil array behaves in the same way. As a result, driving force will be generated substantially constantly from all of the coils, making it possible to generate a high level of torque.

The operation during the period where the phase is between $\pi$ and $2\pi$ is substantially the same as that shown in FIGS. 6A to 6D, and need not be described in detail. However, it should be noted that polarity of the Phase A coil array 14A again reverses at the timing coincident with the phase of $\pi$, and polarity of the Phase B coil array 24B again reverses at the timing coincident with the phase of $3\pi/2$.

As will be understood from the preceding discussion, the electric motor of the present embodiment affords driving force of the magnet array 34M in the operating direction, by utilizing attracting force and repelling force between the magnet array 34M and the coil arrays 14A, 24B. In particular, in the present embodiment, since the coil arrays 14A, 24B are situated at opposite sides of the magnet array 34M, magnetic flux to both sides of the magnet array 34M will be utilized for generating driving force. Consequently, utilization of magnetic flux is higher in comparison to where only one side of the magnets is utilized for generating driving force as in conventional electric motors, thereby affording a motor with good efficiency and high torque. However, it would be possible to omit one of the two coil arrays 14A, 24B.

In preferred practice, the support members 12A, 22B, 32M will be respectively formed from nonmagnetic material. Also, in preferred practice, among the various components of the motor unit of the present embodiment, all components except for the electrical wiring including the coils and sensors, the magnets, and the rotating shaft and its bearings will be formed from materials that are nonmagnetic and electrically nonconductive. By dispensing with a core made of a magnetic body, it is possible to achieve smooth and consistent operation, without the occurrence of cogging. By dispensing with a yoke as part of the magnetic circuit, excitation loss (eddy-current loss) will be held to very low levels, and a motor with good efficiency attained.

1-B. Configuration of Drive Control Circuit

Figure 7A:
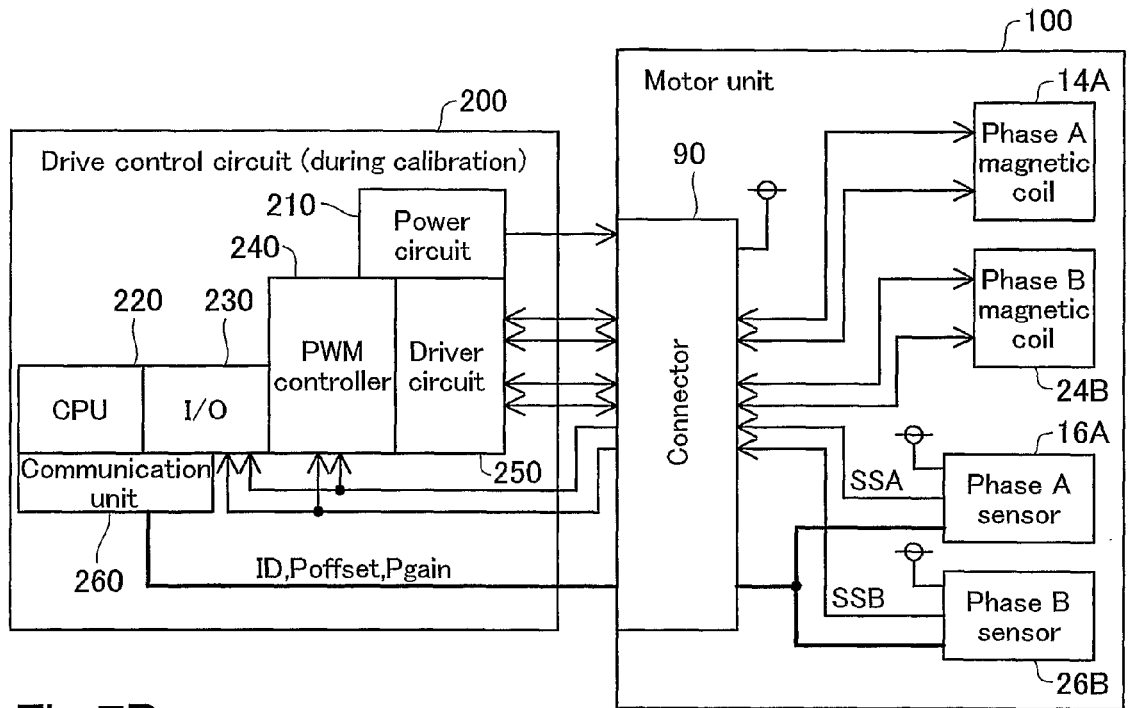
FIGS. 7A and 7B are block diagrams depicting the configuration of a drive control circuit of the motor of Embodiment 1.
Figure 7B:
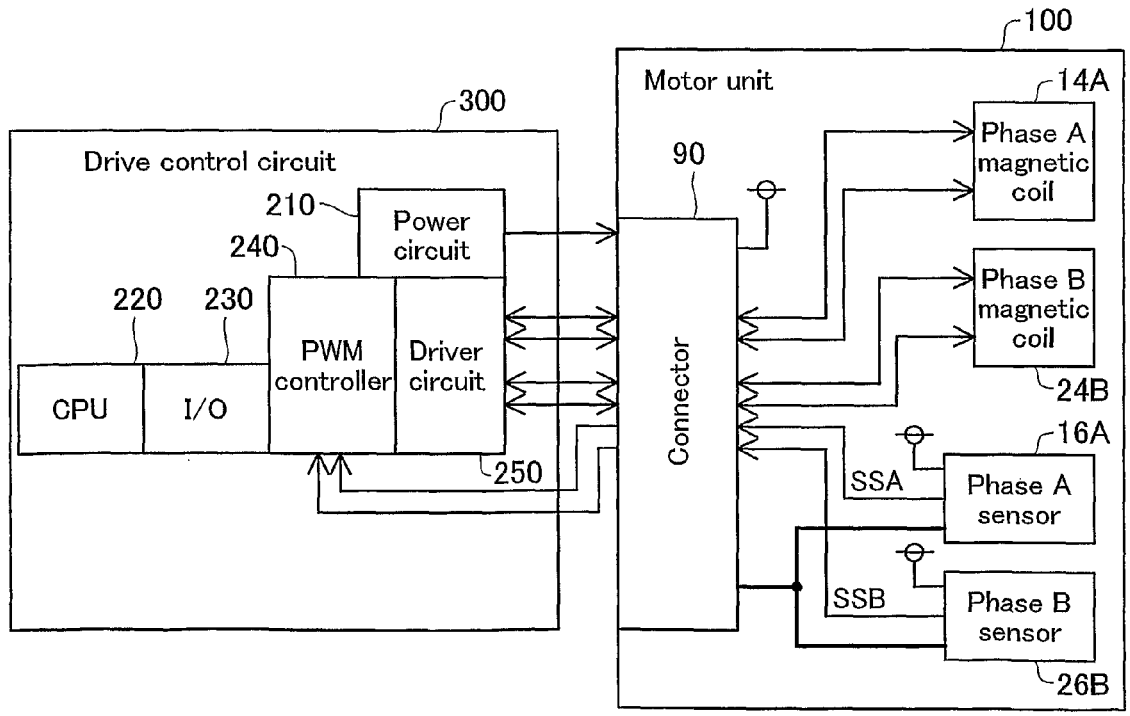

FIGS. 7A and 7B show the configuration of drive control circuits for the motor of Embodiment 1. FIG. 7A depicts the configuration during calibration of sensor waveform, and FIG. 7B depicts the configuration during actual use. "Calibration of sensor waveform" is used synonymously with "correction of sensor output waveform."

As shown in FIG. 7A, during calibration, a drive control circuit 200 for calibration purposes is connected to the connector 90 of the motor unit 100. This drive control circuit 200 has a power circuit 210, a CPU 220, an I/O interface 230, a PWM controller 240, a driver circuit 250, and a communication unit 260. The power circuit 210 supplies power to the circuits in the drive control circuit 200 and to the motor unit 100. The CPU 220 controls the operation of the drive control circuit 200 by means of making settings in the various circuits in the drive control circuit 200. The I/O interface 230 has the function of receiving sensor outputs SSA, SSB supplied from the motor unit 100, and supplying these to the CPU 220. The CPU 220 decides whether the received sensor outputs SSA, SSB have desired waveform shape, and determines an offset correction values Poffset and gain correction values Pgain that will give the desired waveform shape. The method for determination will be discussed in detail later. Hereinafter the offset correction value will be termed simply "offset," and the gain correction value will be termed simply correction value will be termed simply "gain."

The PWM controller 240 generates a PWM signal for driving the coils. The driver circuit 250 is a bridge circuit for driving the coils. The circuit design and operation of the PWM controller 240 and the driver circuit 250 will be discussed later. The communication unit 260 has a function whereby the sensors 16A, 26B are presented with and store in memory the offset correction values Poffset and the gain correction values Pgain that are determined through calibration. The communication unit 260 also has a function for transmitting the correction values Poffset, Pgain stored in the sensors 16A, 26B to an external device. In order to distinguish among correction values for the Phase A sensor 16A and correction values for the Phase B sensor 26B, the communication unit 260 sends and receives an ID code (identification signal) for each sensor, together with the correction values. Where correction values are transmitted using ID codes in this way, it is possible to transmit correction values for multiple sensors via a single communication bus, while distinguishing them from each other.

As shown in FIG. 7B, during actual use of the motor, a drive control circuit 300 which is different from that used during calibration is connected to the connector 90 of the motor unit 100. This drive control circuit 300 corresponds to the drive control circuit 200 for calibration, except that the communication unit 260 is omitted. The CPU 220 may be omitted in the configuration shown in FIGS. 7A and 7B. If the CPU 220 is omitted, the functions of the CPU 220 described in this embodiment will be performed by other circuitry such as a logic circuit and/or a non-volatile memory. Alternatively, the CPU 220 may be replaced with a communication circuit or an interface circuit, which receives various instructions from an external device and transfers the same to the circuit elements within the device control circuit 200 or 300.

Figure 8:
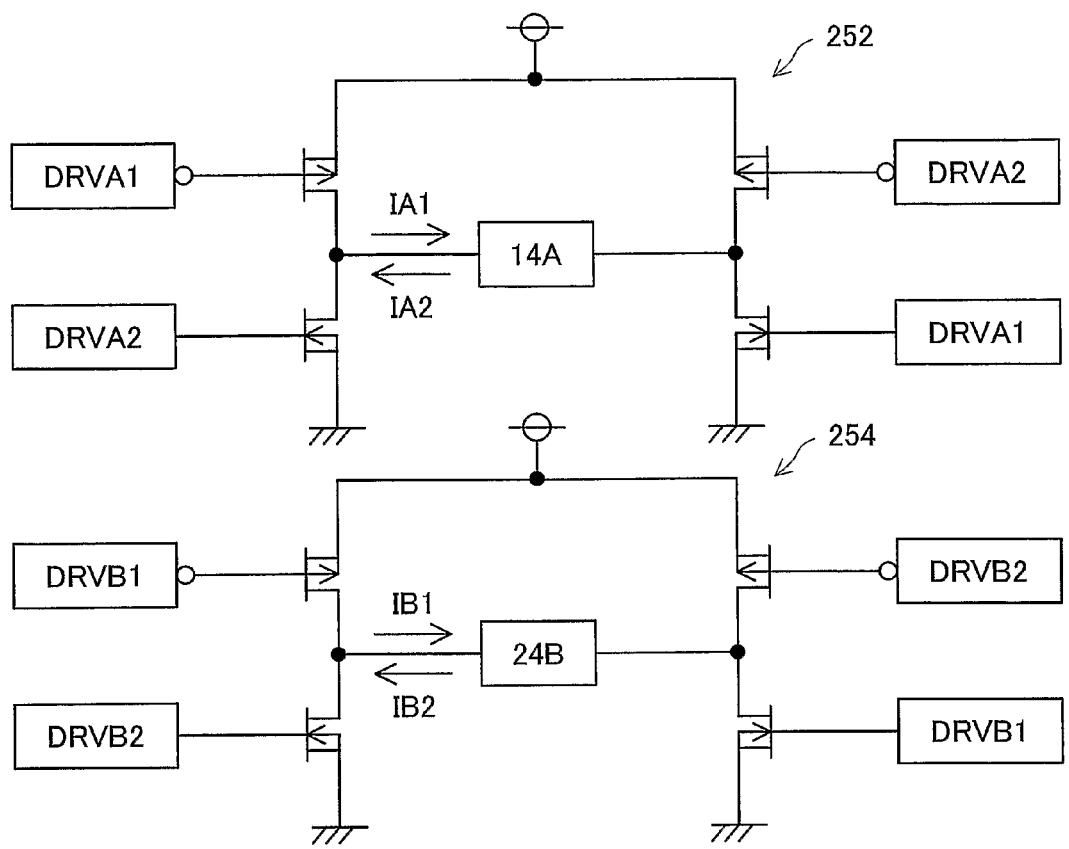
FIG. 8 is a diagram depicting the internal configuration of a driver circuit.

FIG. 8 is a diagram depicting the internal configuration of the driver circuit 250. The Phase A driver circuit 252 is a H-bridge circuit which drives the Phase A coil array 14A in response to AC drive signals DRVA1, DRVA2. The white circles at the terminal part of the blocks depicting the drive signals indicate negative logic, with the signal being inverted. The arrows labeled IA1, IA2 respectively indicate direction of current flow by the drive signals DRVA1, DRVA2. The configuration of the Phase B driver circuit 254 is the same as that of the Phase A driver circuit 252; flow of current IB1, IB2 by drive signals DRVB1, DRVB2 is shown.

Figure 9:
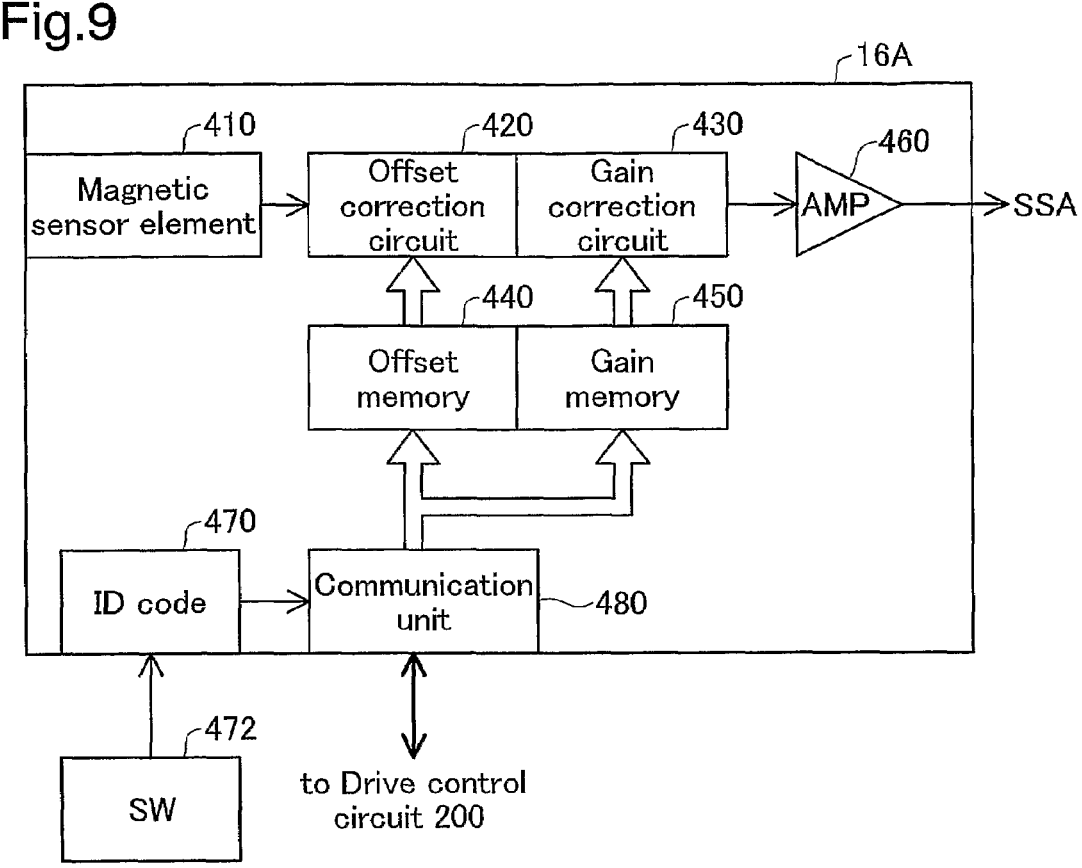
FIG. 9 is a diagram depicting the internal configuration of a magnetic sensor.

FIG. 9 is a diagram depicting the internal configuration of the magnetic sensor 16A used in Embodiment 1. Since the Phase A sensor 16A and the Phase B sensor 26B have identical configuration, only the Phase A sensor 16A will be discussed below.

The magnetic sensor 16A has a magnetic sensor element 410, an offset correction circuit 420, a gain correction circuit 430, an offset memory 440, a gain memory 450, an amplifier 460, an ID code register 470, and a communication unit 480. The magnetic sensor element 410 is a Hall element, for example.

During calibration (FIG. 7A), the communication unit 480 communicates with the drive control circuit 200 and receives an offset correction value Poffset and a gain correction value Pgain for sensor output, together with a sensor ID. An ID unique to the sensor may be recorded in the ID code register 470 inside the sensor, or an ID may be set using an external switch. In the example of FIG. 9, an ID may be set using an external switch 472 such as a DIP switch. However, it is possible for the ID code to be recorded in the motor by any of various other means besides a DIP switch. For example, it would be possible to eliminate the external switch 472 and instead construct the ID code register 470 from nonvolatile memory. In the event that the ID provided by the drive control circuit 200 matches the ID in the ID code register 470, the communication unit 480 will store the offset correction value Poffset and the gain correction value Pgain in the memory 440, 450 respectively. The offset correction circuit 420 and the gain correction circuit 430 will correct the waveform of the magnetic sensor element 410 in accordance with these correction values Poffset, Pgain. The corrected sensor output is then amplified by the amplifier 460, and output as the sensor output SSA.

As will be understood from the discussion above, the circuit elements 420, 430, 440, 450 of FIG. 9 function as the output waveform correcting unit for correcting the output waveform of the sensor 16A. In preferred practice the memory 440, 450 will be composed of nonvolatile memory.

FIGS. 10A to 10E show the internal configuration and operation of the PWM controller 240 (FIG. 7A). The PWM controller 240 has a basic clock generating circuit 510, a 1/N frequency divider 520, a PWM unit 530, a moving direction register 540, multipliers 550, 552, encoders 560, 562, AD converters 570, 572, a voltage control value register 580, and an excitation interval setting unit 590.

The basic clock generating circuit 510 is a circuit that generates a clock signal PCL of prescribed frequency, and is composed of a PLL circuit, for example. The frequency divider 520 generates a clock signal SDC of a frequency which is 1/N the frequency of the clock signal PCL. The value of N is set to a prescribed constant. This value of N has been previously established in the frequency divider 520 by the CPU 220 (FIG. 7A). The PWM unit 530 generates AC drive signals DRVA1, DRVA2, DRVB1, DRVB2 (FIG. 8) in response to the clock signals PCL, SDC, multiplication values supplied by the multipliers 550, 552, a moving direction value RI supplied by the moving direction value register 540, positive/negative sign signals Pa, Pb supplied by the encoders 560, 562, and excitation interval signals Ea, Eb supplied by the excitation interval setting unit 590. This operation will be discussed later.

A value RI indicating the direction of rotation of the motor is established in the moving direction value register 540 by the CPU 220. In the present embodiment, the motor undergoes forward rotation when the moving direction value RI is L level, and reverse rotation when it is H level.

The other signals Ma, Mb, Pa, Pb, Ea, Eb presented to the PWM unit 530 are determined in the manner described below. The multiplier 550, the encoder 560, and the AD converter 570 are circuits for use in Phase A; the multiplier 552, the encoder 562, and the AD converter 572 are circuits for use in Phase B. Since these circuit groups have identical operation, the discussion hereinbelow will mainly focus on operation of the Phase A circuits.

The magnetic sensor output SSA is presented to the AD converter 570. This sensor output SSA has a range, for example, of from GND (ground potential) to VDD (power supply voltage), with the middle point (=VDD/2) being the middle point of the output waveform (the point at which the sine wave passes through the origin). The AD converter 570 performs AD conversion of this sensor output SSA to generate a digital value of sensor output. The output of the AD converter 570 has a range, for example, of FFh to 0 h (the "h" suffix denotes hexadecimal), with the median value of 80 h corresponding to the middle point of the output waveform.

The encoder 560 converts the range of the sensor output value subsequent to AD conversion, and sets the value of the middle point of the output waveform to 0. As a result, the sensor output value Xa generated by the encoder 560 assumes a prescribed range on the positive side (e.g. +127 to 0) and a prescribed range on the negative side (e.g. 0 to −127). However, the value presented by the encoder 560 to the multiplier 560 is the absolute value of the sensor output value Xa; the positive/negative sign thereof is presented to the PWM unit 530 as the positive/negative sign signal Pa.

The voltage control value register 580 stores a voltage control value Ya established by the CPU 220. This voltage control value Ya, together with the excitation interval signal Ea discussed later, functions as a value for setting application voltage of the motor; the value Ya can take a value of 0 to 1.0, for example. Assuming an instance where the excitation interval signal Ea has been set in such a way that all intervals are excitation intervals, with no non-excitation intervals being provided, Ya=0 will mean that the application voltage is zero, and Ya=1.0 will mean that the application voltage is the maximum value. The multiplier 550 performs multiplication of the voltage control value Ya and the sensor output value Xa output from the encoder 560 and conversion to an integer; the multiplication value Ma thereof is presented to the PWM unit 530.

FIGS. 10B to 10E depict operation of the PWM unit 530 in instances where the multiplication value Ma takes various different values. Here, it is assumed that all intervals are excitation intervals, with no non-excitation intervals. The PWM unit 530 is a circuit that, during each cycle of the clock signal SDC, generates one pulse with a duty factor of Ma/N. Specifically, as shown in FIGS. 10B to 10E, in association with increase of the multiplication value Ma, the pulse duty factor of the drive signals DRVA1, DRVA2 increases as well. The first drive signal DRVA1 is a signal that generates a pulse only when the sensor output SSA is positive, and the second drive signal DRVA2 is a signal that generates a pulse only when the sensor output SSA is negative; in FIGS. 10B to 10E, these are shown together. For convenience, the second drive signal DRVA2 is shown as negative pulses.

FIGS. 11A to 11D depict correspondence relationships between sensor output waveforms and waveforms of drive signals generated by the PWM unit 530. In the drawing, "Hiz" denotes high impedance. As explained in FIGS. 10A to 10E, the Phase A drive signals DRVA1, DRVA2 are generated by PWM control using the analog waveform of the Phase A sensor output as-is. This is true for the Phase B drive signals DRVB1, DRVB2 as well. Consequently, it is possible for the Phase A coils and Phase B coil to be presented with effective voltage that exhibits change in level corresponding to change in the sensor outputs SSA, SSB.

Figure 11A:
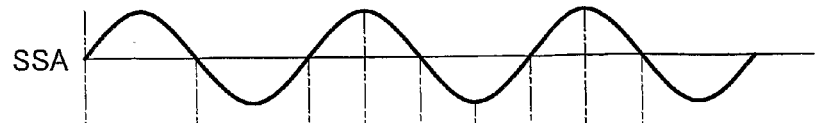
FIGS. 11A through 11F illustrate correspondence relationships between sensor output waveform and drive signal waveform.
Figure 11B:
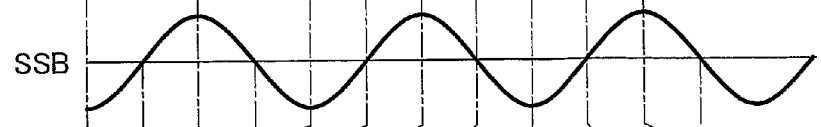
Figure 11C:
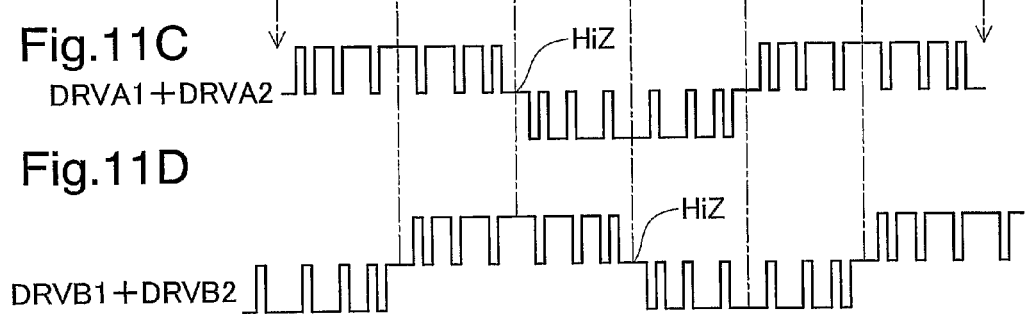
Figure 11D:
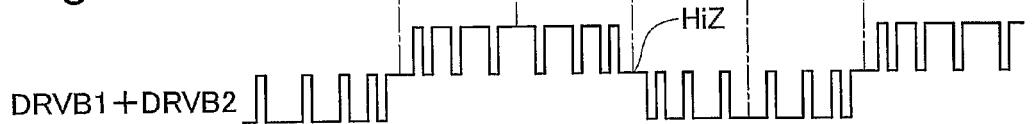
Figure 11E:
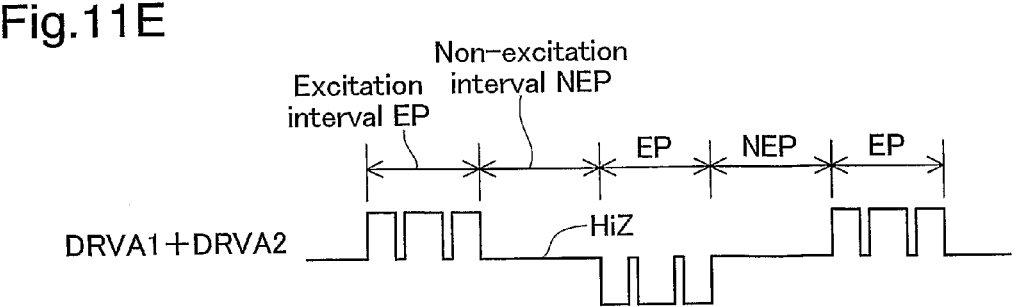
Figure 11F:
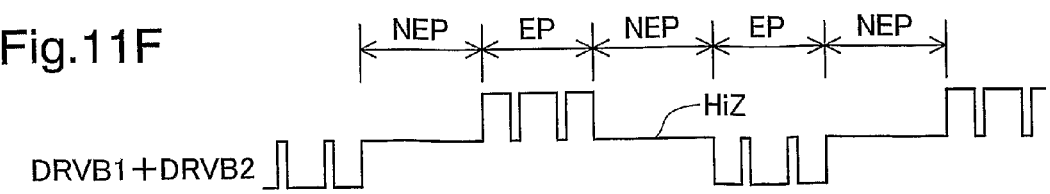

The PWM unit 530 is furthermore designed so that a drive signal is output during excitation intervals that are indicated by the excitation interval signals Ea, Eb supplied by the excitation interval setting unit 590, and so that no drive signal is output during intervals other than the excitation intervals (non-excitation intervals). FIGS. 11E and 11F depict drive signal waveforms produced in the case where excitation intervals EP and non-excitation intervals NEP have been established by the excitation interval signals Ea, Eb. In the excitation intervals EP, the drive signal pulses of FIGS. 11C and 11D are generated as is; in the non-excitation intervals NEP, no pulses are generated. By establishing excitation intervals EP and non-excitation intervals NEP in this way, there is no application of voltage to the coils in proximity to the middle points of the back electromotive force waveform (i.e. in proximity to the middle points of sensor output), thus making possible further improvement of motor efficiency. In preferred practice excitation intervals EP will be established in intervals that are symmetric about the peaks of the back electromotive force waveform (the induced voltage waveform), and the non-excitation intervals NEP will be established in intervals that are symmetric about the middle points of the back electromotive force waveform.

As discussed previously, if the voltage control value Ya is set to a value less than 1, the multiplication value Ma will be small compared with the voltage control value Ya. Consequently, effective adjustment of application voltage through the voltage control value Ya is possible as well.

As will be understood from the preceding discussion, with the motor of the present embodiment, it is possible to adjust the application voltage using both the voltage control value Ya and the excitation interval signal Ea. This is true for Phase B as well. In preferred practice, relationships between the preferred application voltage on the one hand, and the voltage control value Ya and the excitation interval signal Ea on the other, will be stored in advance in table format in memory in the drive control circuit 300. By so doing it is possible, when the drive control circuit 300 has received the preferred application voltage from the outside, for the CPU 220 in response to the drive signal to set the voltage control value Ya and the excitation interval signal Ea in the PWM controller 240. Adjustment of application voltage does not require the use of both the voltage control value Ya and the excitation interval signal Ea, and it would be acceptable to use either of these instead.

Figure 12:
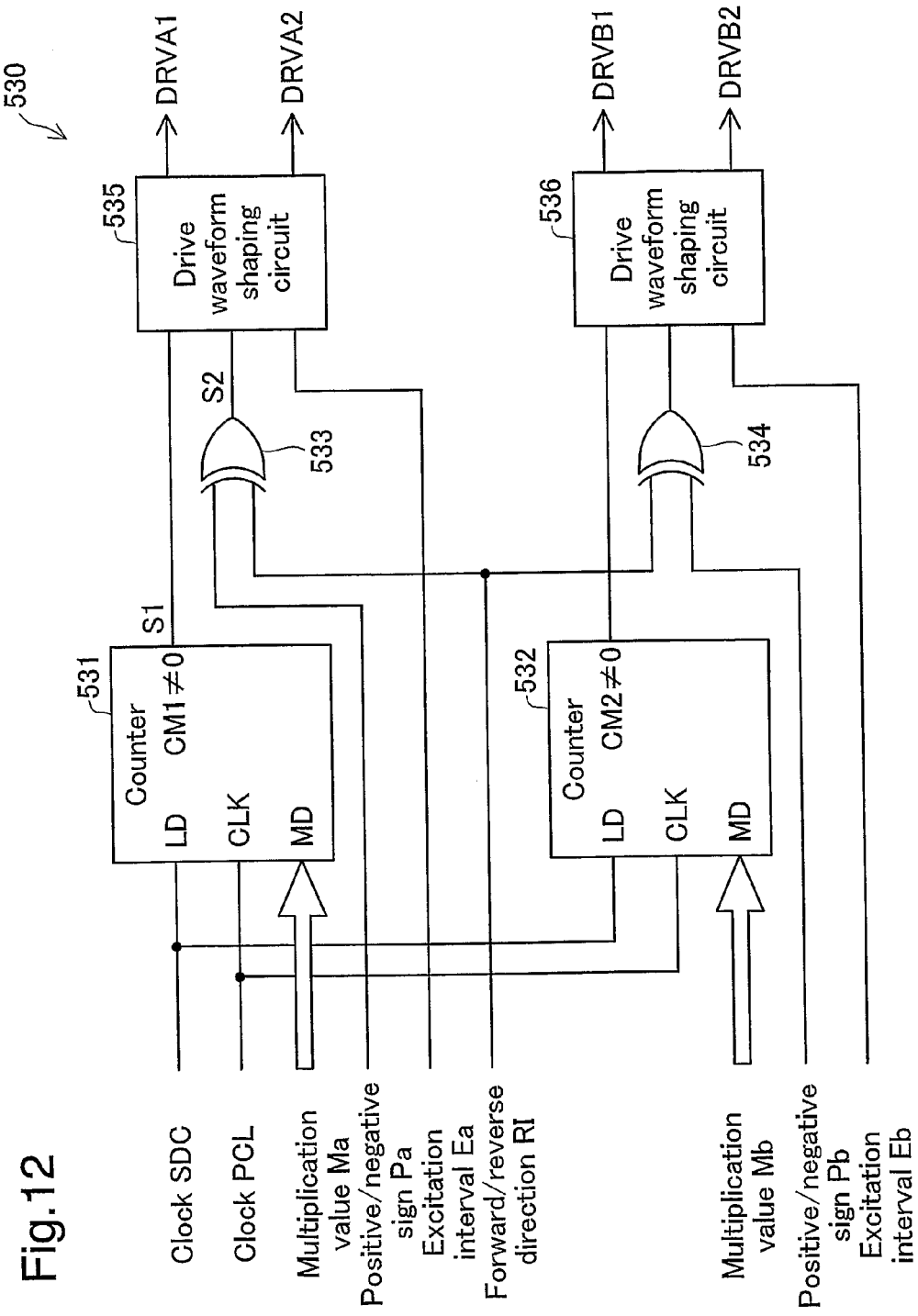
FIG. 12 is a block diagram depicting the internal configuration of a PWM unit.

FIG. 12 is a block diagram depicting the internal configuration of the PWM unit 530 (FIG. 10A). The PWM unit 530 has counters 531, 532, EXOR circuits 533, 534, and drive waveform shaping units 535, 536. The counter 531, the EXOR circuit 533, and the drive waveform shaping unit 535 are circuits used for Phase A; the counter 532, the EXOR circuit 534, and the drive waveform shaping unit 536 are circuits used for Phase B. Their operation will be described below.

Figure 13:
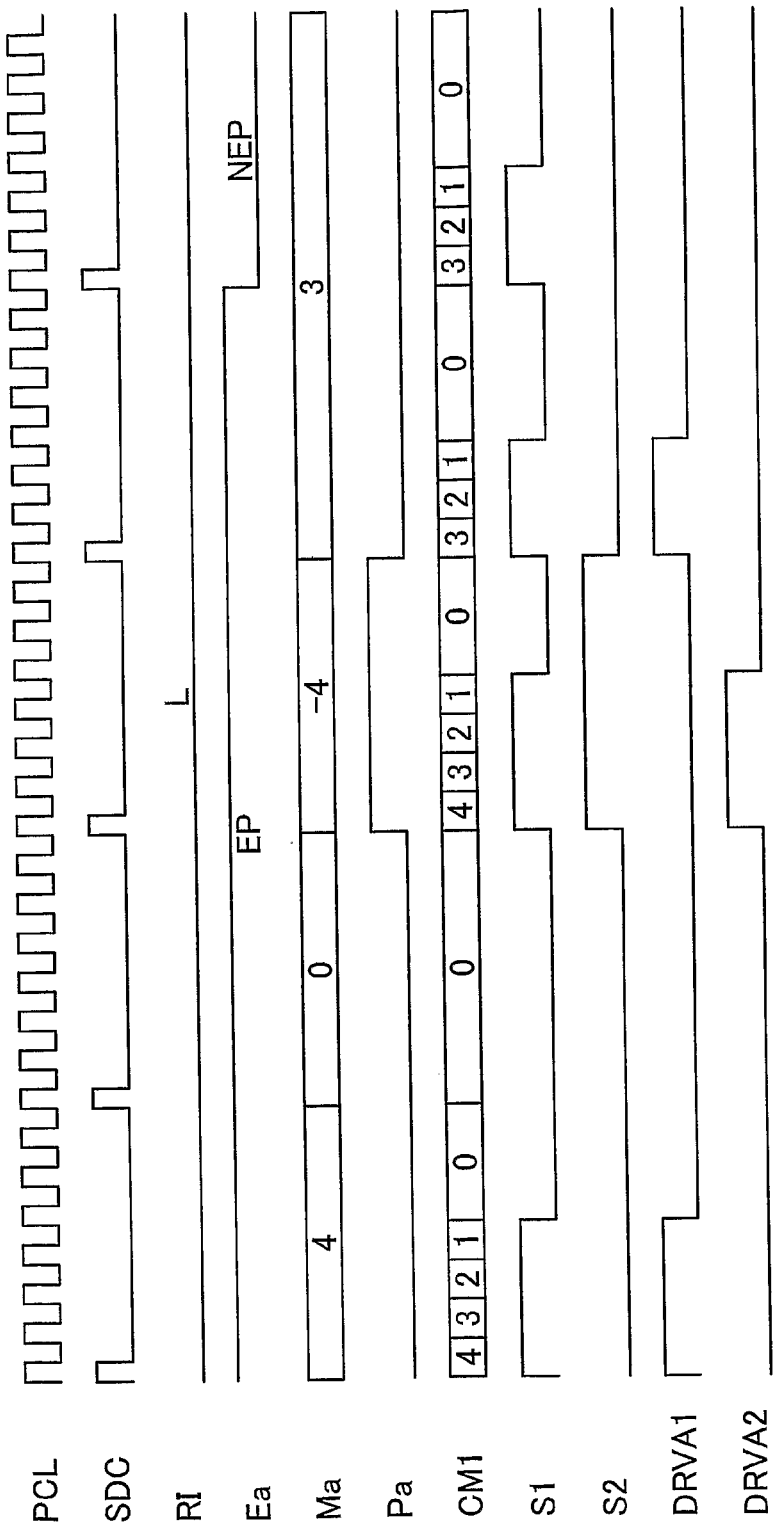
FIG. 13 is a timing chart depicting operation of the PWM unit during forward rotation of the motor.

FIG. 13 is a timing chart depicting operation of the PWM unit 530 during forward rotation of the motor. There are shown the two clock signals PCL and SDC, the moving direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping unit 535. For each cycle of the clock signal SDC, the counter 531 repeats an operation decrementing the count value CM1 to 0 in sync with the clock signal PCL. The initial value of the count value CM1 is set to the multiplication value Ma. In FIG. 13, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 representing exclusive OR of the positive/negative sign signal Pa and the moving direction value RI. When the motor is running forward, the moving direction value RI is L level. Consequently, the output S2 of the EXOR circuit 533 will be a signal identical to the positive/negative sign signal Pa. The drive waveform shaping unit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is L level is output as the drive signal DRVA1, and the signal during intervals in which the output S2 of the EXOR circuit 533 is H level is output as the drive signal DRVA2. The excitation interval signal Ea falls to L level in proximity to the right end in FIG. 13, thereby setting up a non-excitation interval NEP. Consequently, neither of the drive signals DRVA1, DRVA2 is output during this non-excitation interval NEP, and a state of high impedance is maintained.

FIG. 14 is a timing chart depicting operation of the PWM unit 530 during reverse rotation of the motor. When the motor is running in reverse, the moving direction value RI is H level. As a result, the two drive signals DRVA1, DRVA2 switch position with those in FIG. 13, and it will be appreciated that the motor runs in reverse as a result. The Phase B circuits 532, 534, 536 of the PWM unit 530 operate the same as those discussed above.

Figure 15A:
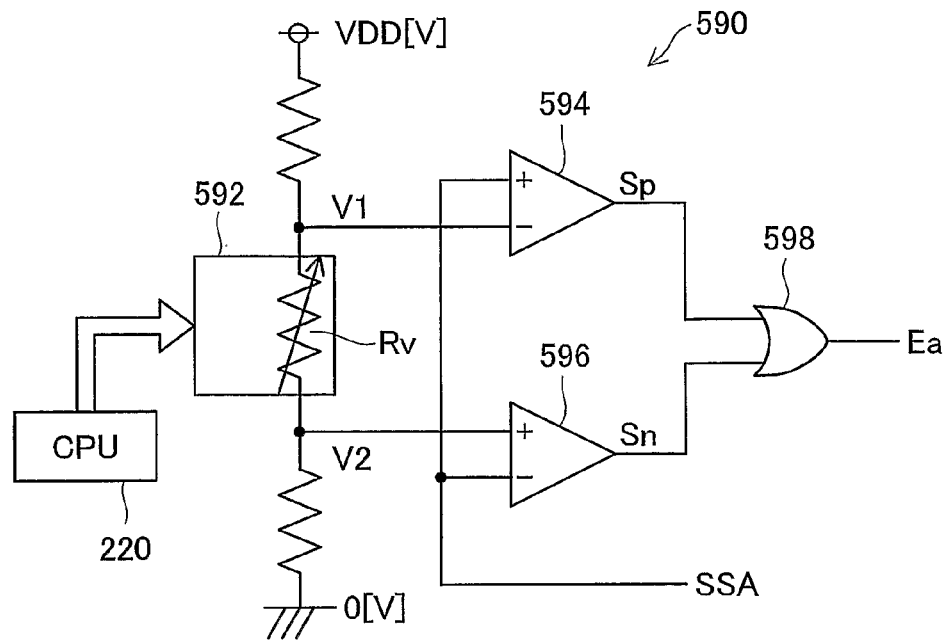
FIGS. 15A and 15B show the internal configuration and operation of an excitation interval setting unit.
Figure 15B:
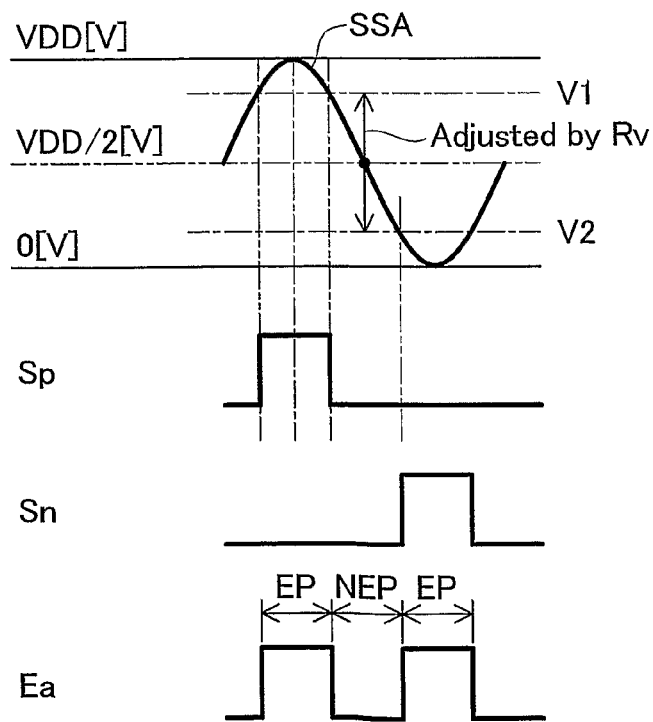

FIGS. 15A and 15B show the internal configuration and operation of the excitation interval setting unit 590. The excitation interval setting unit 590 has an electronic variable resistor 592, voltage comparators 594, 596, and an OR circuit 598. The resistance Rv of the electronic variable resistor 592 is set by the CPU 220. The voltages V1, V2 at the two terminals of the electronic variable resistor 592 are presented to one input terminal of each of the voltage comparators 594, 596. The sensor output SSA is presented to the other input terminal of the voltage comparators 594, 596. In FIG. 15A, for convenience the Phase B circuits have been eliminated from the illustration. The output signals Sp, Sn of the voltage comparators 594, 596 are input to the OR circuit 598. The output of the OR circuit 598 is the excitation interval signal Ea, used for distinguishing excitation intervals from non-excitation intervals.

FIG. 15B depicts operation of the excitation interval setting unit 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal assuming the logical sum of the these output signals Sp, Sn. Consequently, as shown at bottom in FIG. 15B, the excitation interval signal Ea can be used as a signal indicating excitation intervals EP and non-excitation intervals NEP. The excitation intervals EP and non-excitation intervals NEP are established by means of adjustment of the variable resistance Rv by the CPU 220.

1-C. Correction of Sensor Output

Figure 16A:
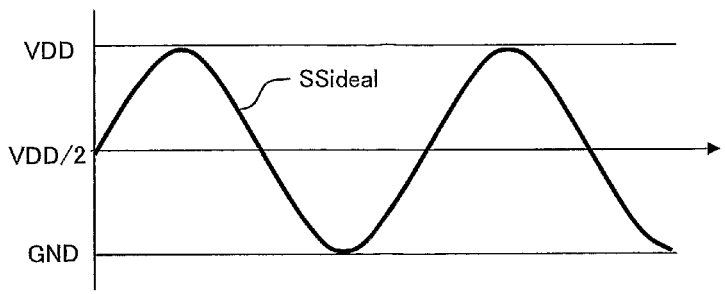
FIGS. 16A through 16C show the specifics of offset correction of sensor output.
Figure 16B:
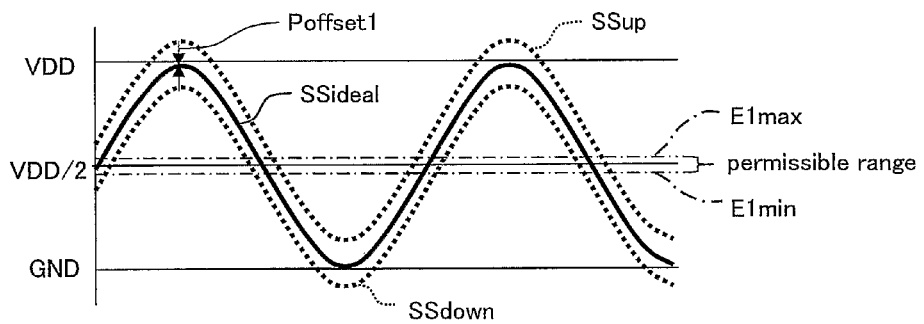
Figure 16C:
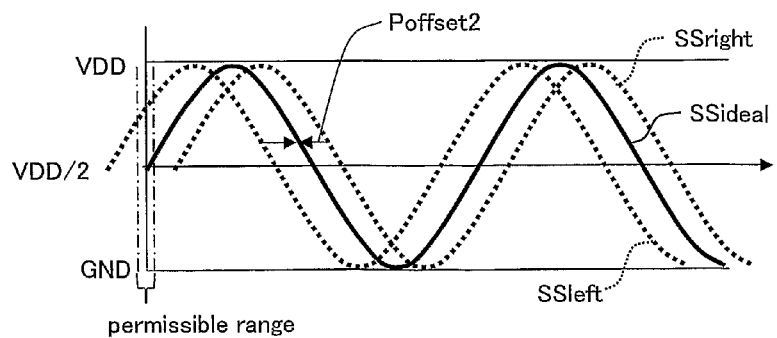

FIGS. 16A to 16C show the specifics of offset correction of sensor output. FIG. 16A shows the desired waveform SSideal of sensor output. FIG. 16B depicts an example of sensor output SSup shifted upward from the desired waveform SSideal, and sensor output SSdown shifted downward. In such instances, by applying vertical offset Poffset1 to the shifted sensor output (e.g. SSup), it can be corrected to a waveform approximating the desired waveform SSideal. This correction is carried out in such a way that, for example, the middle point of the output waveform (the location where output level assumes its median value) falls within a prescribed permissible range, from the median value VDD/2 of the sensor output voltage range (GND to VDD).

FIG. 16C depicts an example of sensor output SSright shifted rightward from the desired waveform SSideal, and sensor output SSleft shifted leftward. In such instances, by applying sideways offset Poffset2 to the shifted sensor output (e.g. SSright), it can be corrected to a waveform approximating the desired waveform SSideal. This correction is carried out in such a way that the phase of the middle point of the output waveform (the location where output level assumes its median value) falls within a prescribed permissible range, from the phase of the median value VDD/2 of the sensor output voltage range (GND to VDD). The determination as to whether the sensor output is offset to the sideways direction can be made by stopping the rotor of the motor at a prescribed reference location (the location that should properly be the middle point of the output waveform), and checking whether the sensor output is equal to the median value VDD/2 of the sensor output voltage range.

In this way it is possible to correct both vertical offset Poffset1 and sideways offset Poffset2. However, in many instances it will suffice for practical purposes to correct only one of these two types of offset. Accordingly, in the procedure described below, it is assumed that, of the two types of offset, only vertical offset Poffset1 is to be corrected.

Figure 17A:
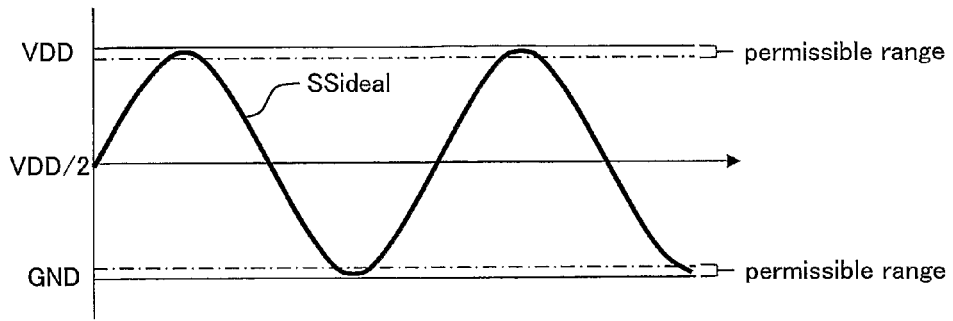
FIGS. 17A through 17C show the specifics of gain correction of sensor output.
Figure 17B:
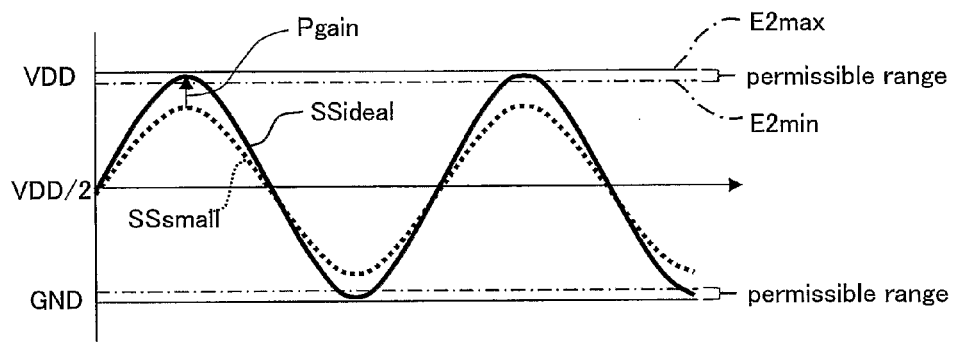
Figure 17C:
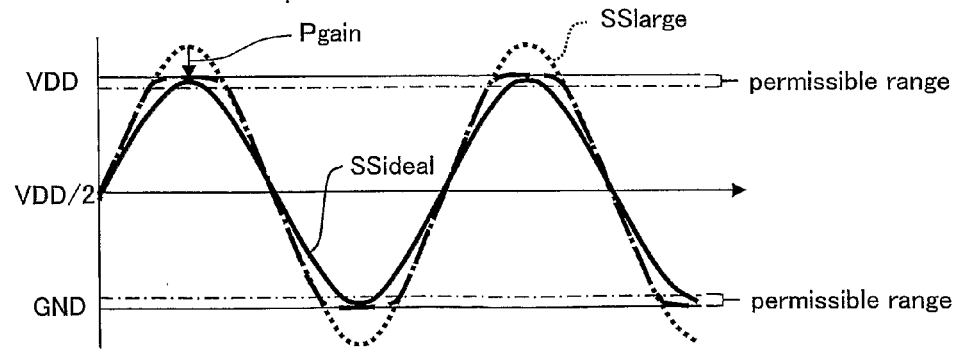

FIGS. 17A to 17C show the specifics of gain correction of sensor output. FIG. 17A depicts the desired output waveform SSideal for sensor output; it is the same as that in FIG. 16A. FIG. 17B depicts a sensor output waveform SSmall having a smaller peak than the desired output waveform SSideal. In this case, by multiplying the sensor output waveform SSmall by gain Pgain greater than 1, it can be corrected to a waveform approximating the desired waveform SSideal. More specifically, this gain correction is carried out in such a way that the peak value of the corrected sensor output falls within a prescribed permissible range. FIG. 17C depicts a sensor output waveform SSlarge having a larger peak than the desired output waveform SSideal. With this sensor output waveform SSlarge, since points that would go above the maximum value VDD of the voltage range (i.e. the power supply voltage) come to a halt at VDD, the peaks are observed to have a flattened waveform as indicated by the dot-and-dash line. In this case, by multiplying the sensor output waveform SSlarge by gain Pgain smaller than 1, it can be corrected to a waveform approximating the desired waveform SSideal.

Figure 18:
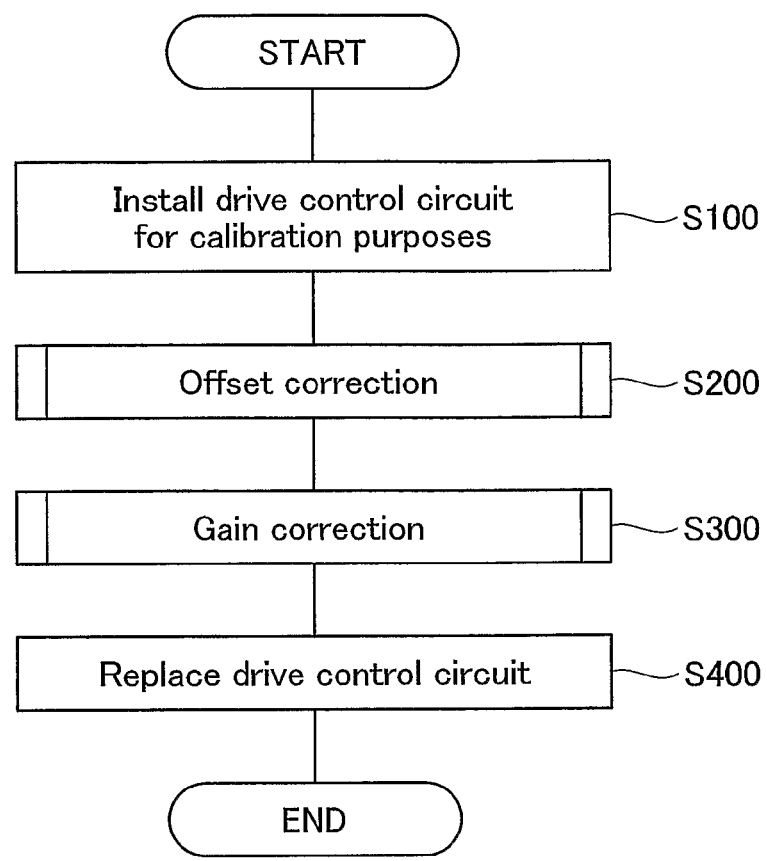
FIG. 18 is a flowchart depicting the calibration procedure of sensor output.

FIG. 18 is a flowchart depicting the calibration procedure of sensor output. In Step S100, the drive control circuit 200 for calibration purposes is installed in the motor unit 100 (FIG. 7A). In Step S200, offset correction as described in FIG. 16B is performed, and in Step S300 gain correction as described in FIGS. 17B and 17C is performed. In Step S400, the drive control circuit is replaced with the circuit 300 for actual use (FIG. 7B).

Figure 19:
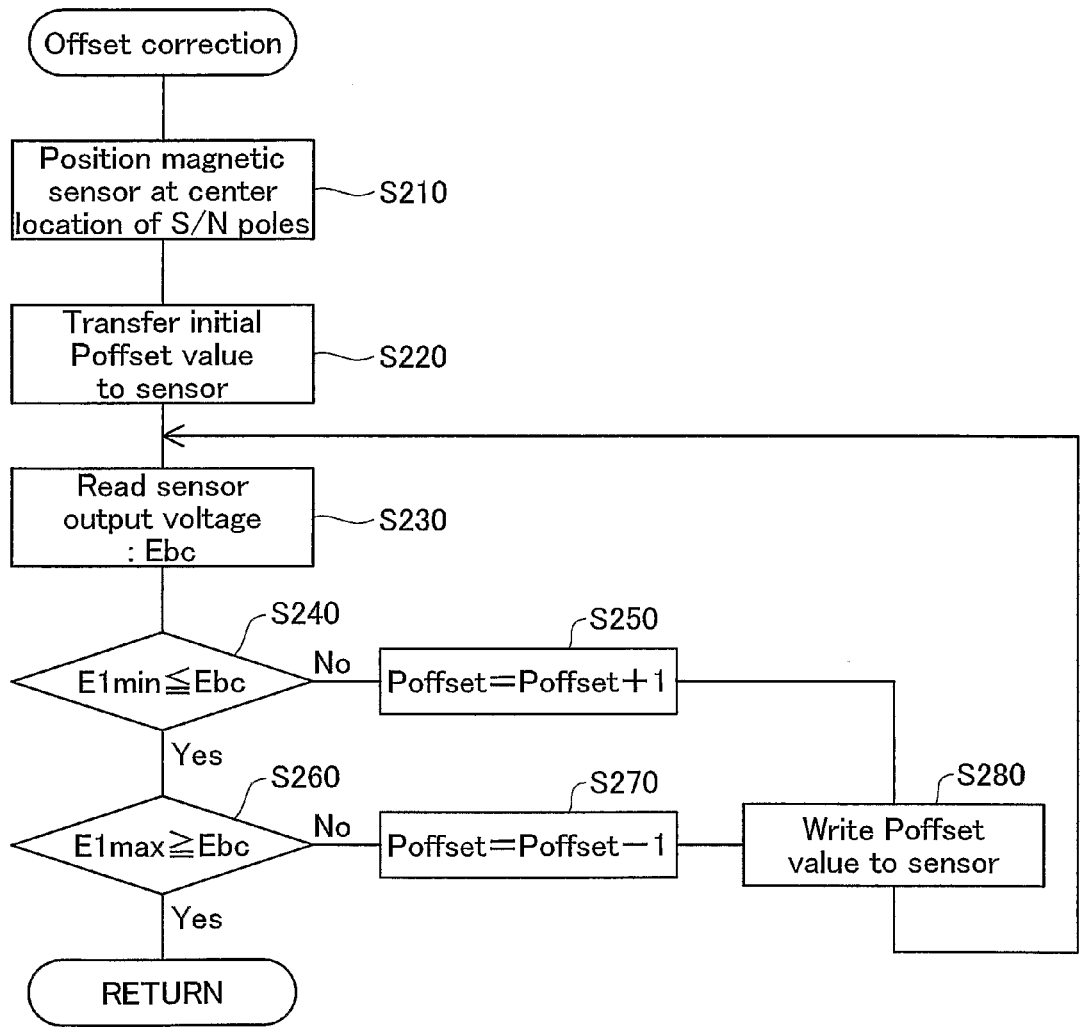
FIG. 19 is a flowchart depicting in detail the procedure of offset correction.

FIG. 19 is a flowchart depicting in detail the procedure of offset correction. While the following description pertains to offset correction of the Phase A sensor, correction would be performed in the same way for the Phase B sensor. When offset correction is performed for one magnetic sensor, the ID of the magnetic sensor targeted for correction is initially specified by the CPU 220, and the correction process is initiated for the specified magnetic sensor.

In Step S210, the rotor unit 30 (FIG. 1A) is rotated and halted where the magnetic sensor 16A is at the location of a magnet N/S pole boundary. This operation can be carried out manually, with the cover of the motor unit open, for example. In Step S220, an initial value of offset Poffset is transmitted from the drive control circuit 200 to the magnetic sensor 16A and stored in the offset memory 440 (FIG. 9) in the magnetic sensor 16A. Any value can be used as the initial value for Poffset. However in preferred practice the initial value will be set to a positive non-zero value, so as permit increase or decrease of the offset Poffset by means of offset correction.

In Step S230, the voltage Ebc of the output signal SSA output by the magnetic sensor 16A is measured. In Step S240, it is decided whether the measured voltage Ebc is equal to or greater than the minimum value E1min (see FIG. 16B) of a permissible range. In the event that the voltage Ebc is smaller than the minimum value E1min of the permissible range, since the voltage Ebc falls outside of the permissible range, the routine moves to Step S250, the offset value Poffset is incremented by one, and then in Step S280 the offset value Poffset is written to the magnetic sensor 16A. On the other hand, in the event that the voltage Ebc is equal to or greater than the minimum value E2min of the permissible range in Step S240, it is then decided in Step S260 whether the voltage Ebc is equal to or less than the maximum value E1max of the permissible range. In the event that the voltage Ebc is greater than the maximum value E1max of the permissible range, since the voltage Ebc falls outside of the permissible range, the routine moves to Step S270, the offset value Poffset is decremented by one, and then in Step S280 the offset value Poffset is written to the magnetic sensor 16A. If on the other hand in Step S260 the voltage Ebc is equal to or less than the maximum value E1max of the permissible range, the voltage Ebc falls within the permissible range, and therefore the process of FIG. 19 terminates.

Figure 20:
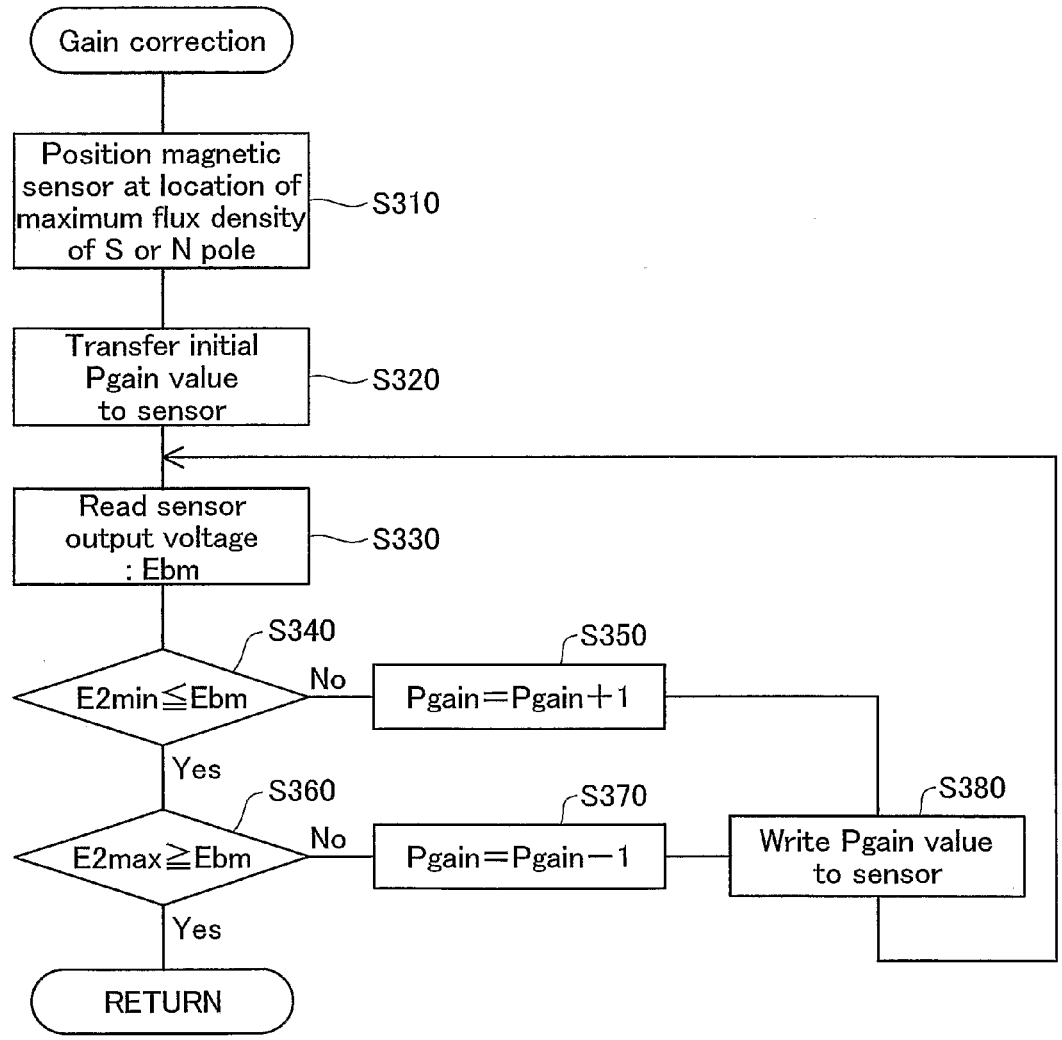
FIG. 20 is a flowchart depicting in detail the procedure of gain correction.

FIG. 20 is a flowchart depicting in detail the procedure of gain correction in Step S300. With regard to gain correction as well, only correction of the Phase A sensor will be discussed. When gain correction is carried out for one sensor, the ID of the magnetic sensor targeted for correction is initially specified by the CPU 220, and the correction process is initiated for the specified magnetic sensor.

In Step S310, the rotor unit 30 (FIG. 1A) is rotated and halted where the magnetic sensor 16A is at a location directly opposite the S pole or N pole of a magnet. This location is the location of maximum magnetic flux density of the magnetic sensor 16A. This operation can be carried out manually, with the cover of the motor unit open, for example. In Step S320, an initial value of gain Pgain is transmitted from the drive control circuit 200 to the magnetic sensor 16A and stored in the gain memory 450 (FIG. 9) in the magnetic sensor 16A. While any value can be used as the initial value for gain Pgain, in preferred practice it will be set to a positive non-zero value.

In Step S330, the voltage Ebm of the output signal SSA of the magnetic sensor 16A is measured. In Step S340, it is decided whether the measured voltage Ebm is equal to or greater than the minimum value E2min (see FIG. 17B) of a permissible range. In the event that the voltage Ebm is smaller than the minimum value E2min of the permissible range, since the voltage Ebm falls outside of the permissible range, the routine moves to Step S350, the gain value Pgain is incremented by one, and then in Step S380 the gain value Pgain is written to the magnetic sensor 16A. On the other hand, in the event that the voltage Ebm is equal to or greater than the minimum value E2min of the permissible range in Step S340, it is then decided in Step S360 whether the voltage Ebm is equal to or less than the maximum value E2max of the permissible range. In the event that the voltage Ebm is greater than the maximum value E2max of the permissible range, since the voltage Ebm falls outside of the permissible range, the routine moves to Step S370, the gain value Pgain is decremented by one, and then in Step S380 the gain value Pgain is written to the magnetic sensor 16A. If on the other hand in Step S360 the voltage Ebm is equal to or less than the maximum value E2max of the permissible range, the voltage Ebm falls within the permissible range, and therefore the process of FIG. 20 terminates.

In preferred practice, the maximum value E2max of the permissible range during gain correction will be a value slightly smaller than the maximum value possible for sensor output (i.e. the power supply voltage VDD). The reason is that since sensor output voltage cannot go above the power supply voltage VDD, if the maximum value E2max of the permissible range is set to the power supply voltage VDD, there exists a possibility that it will not be possible to determine if the peak of the sensor output SSA prior to correction is flattened as depicted by the dot-and-dash line in FIG. 17C.

In this way, with the electric motor of the present embodiment, it is possible for offset correction and gain correction of output waveform to be carried out respectively, for the respective magnetic sensors 16A, 26B. Moreover, the drive control circuit 300 generates drive signals utilizing continuous change in analog output of the sensors. Consequently, through correction of the output of the magnetic sensors 16A, 26B to prescribed waveform shape, it is possible to achieve a high efficiency motor that experiences minimal noise and vibration.

1-D. Modification Example of Drive Control Circuit

Figure 21:
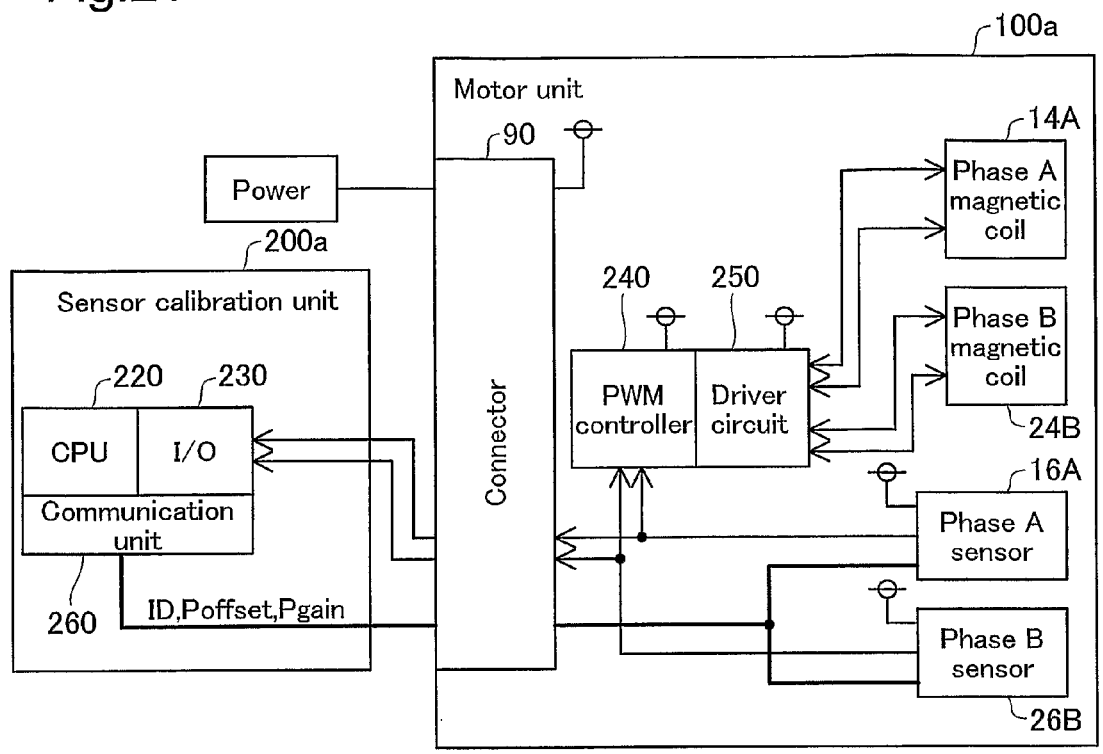
FIG. 21 is a block diagram depicting a modification example of the drive control circuit for calibration.

FIG. 21 is a block diagram depicting a modification example of the drive control circuit for calibration. This drive control circuit 200a is similar to the drive control circuit 200 depicted in FIG. 7A, but omits the power supply circuit 210, the PWM controller 240, and the driver circuit 250. Power to the motor unit 100a is supplied directly to the motor unit 100a via the connector 90. The PWM controller 240 and the driver circuit 250 are provided inside the motor unit 100a. With this arrangement as well, sensor waveform can be corrected and the motor operated with high efficiency, in the same manner as the motor depicted in FIGS. 7A and 7B.

Figure 22:
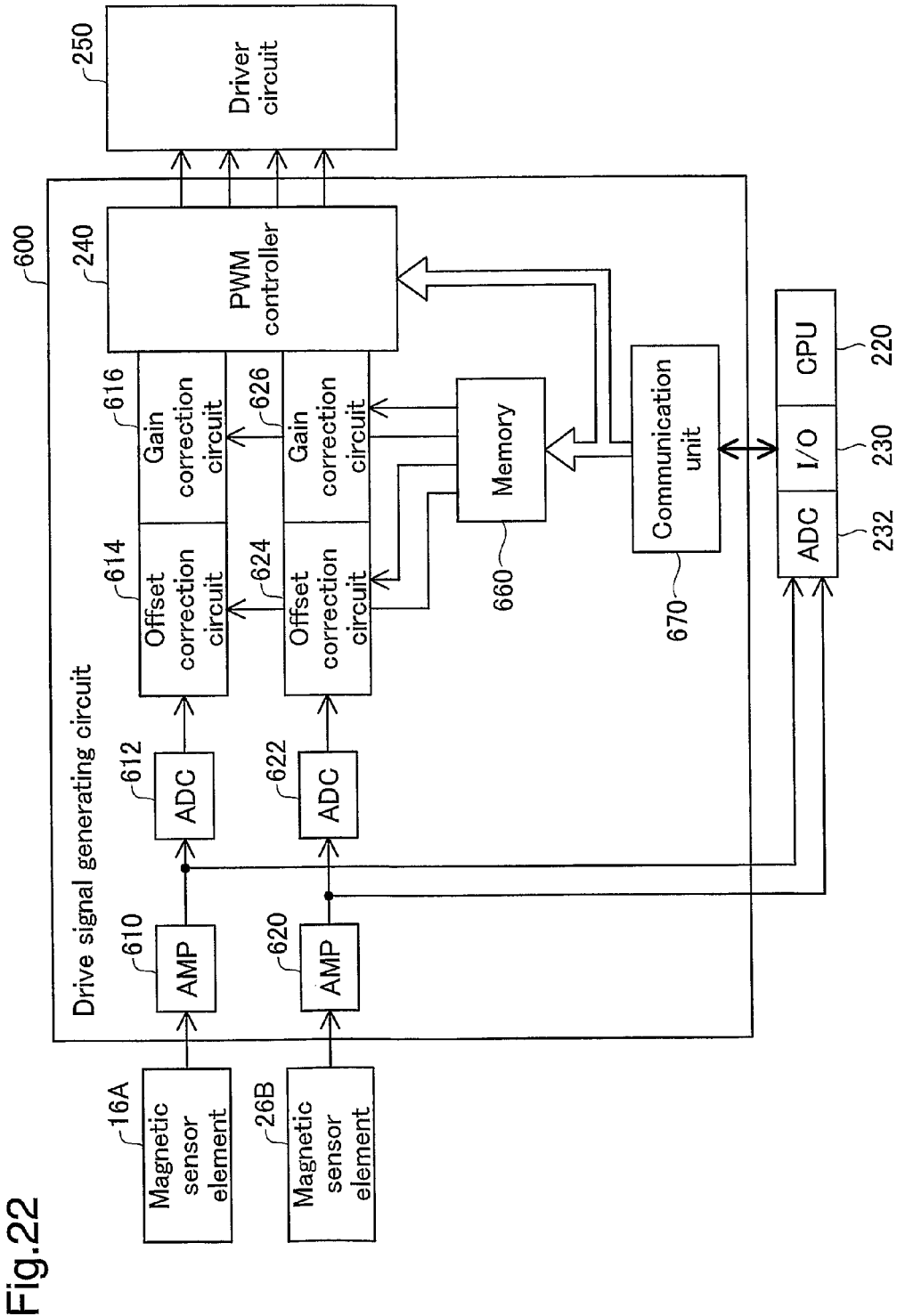
FIG. 22 is a block diagram depicting magnetic sensors and a drive signal generating circuit in a modification example of Embodiment 1.

FIG. 22 is a block diagram depicting the magnetic sensors and drive signal generating circuit in another modification example of Embodiment 1. In this modification example, the magnetic sensors 16A, 26B contain magnetic sensor elements only; the other circuit elements 420-480 within the magnetic sensors depicted in FIG. 9 are not included in these magnetic sensors. The drive signal generating circuit 600 has amplifiers 610, 620, AD converters 612, 622, offset correction circuits 614, 624, gain correction circuits 616, 626, a PWM controller 240, a correction value memory 660, and a communication unit 670. The offset correction circuits 614, 624 are the same as the offset correction circuit 420 shown in FIG. 9, and the gain correction circuits 616, 626 are the same as the gain correction circuit 430 shown in FIG. 9. The correction value memory 660 stores offset correction values and gain correction values relating to both the Phase A sensor 16A and the Phase B sensor 26B, with these values being associated with the respective ID codes. The PWM controller 240 is the same as that shown in FIG. 10A. The communication unit 670 is coupled to the CPU 220 via the I/O interface 230. During calibration, the outputs of the sensors 16A, 26B are amplified by the amplifiers 610, 620, converted to a digital signal by the AD converter 232, and presented to the CPU 220 via the I/O interface 230.

With the circuit design of FIG. 22, it is possible, for example, for the drive signal generating circuit 600 and the driver circuit 250 to be installed in the motor unit, and for a circuit including the CPU 220, the I/O interface 230, and the AD converter 232 to connect with the connector 90 of the motor unit (FIG. 7A). With this circuit design, as with the embodiment discussed previously, it is possible for sensor waveform to be corrected and the motor operated with high efficiency.

Figure 23:
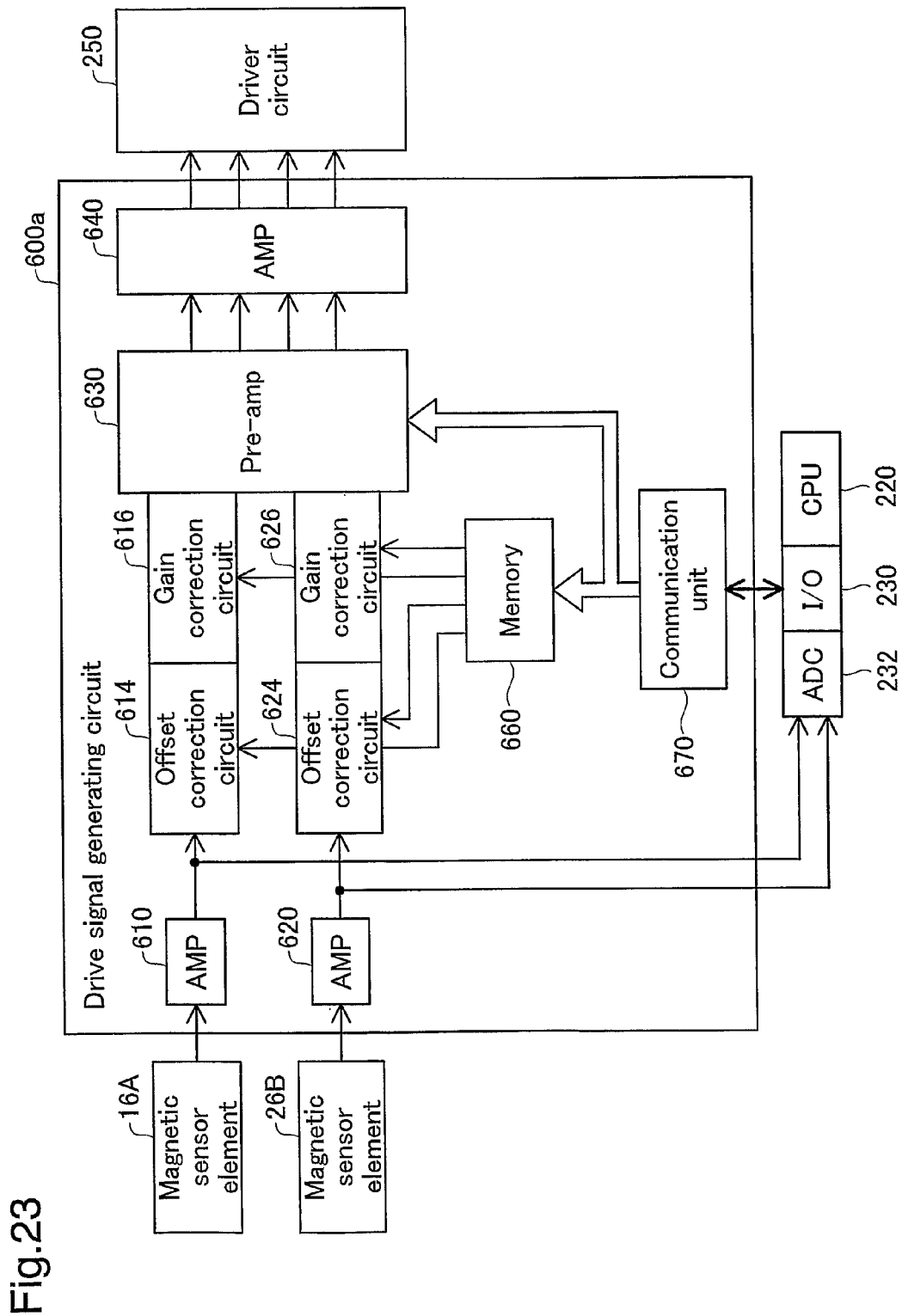
FIG. 23 is a block diagram depicting another modification example of the drive signal generating circuit.

FIG. 23 is a block diagram depicting a modification example of the drive signal generating circuit. In this drive signal generating circuit 600a, the PWM controller 240 of the drive signal generating circuit 600 shown in FIG. 22 is replaced with a pre-amplifier 630 and an amplifier 640. The configuration is otherwise the same as that shown in FIG. 22. The pre-amp 630 and the amp 640 generate drive signals by amplifying as-is the corrected analog sensor outputs. In this way, even where sensor output is amplified using analog circuits and without employing PWM control, it is possible nevertheless to operate the motor with high efficiency, by means of carrying out correction of sensor waveform as described above.

1-E. Other Procedure for Implementing Sensor Output Correction

Figure 24:
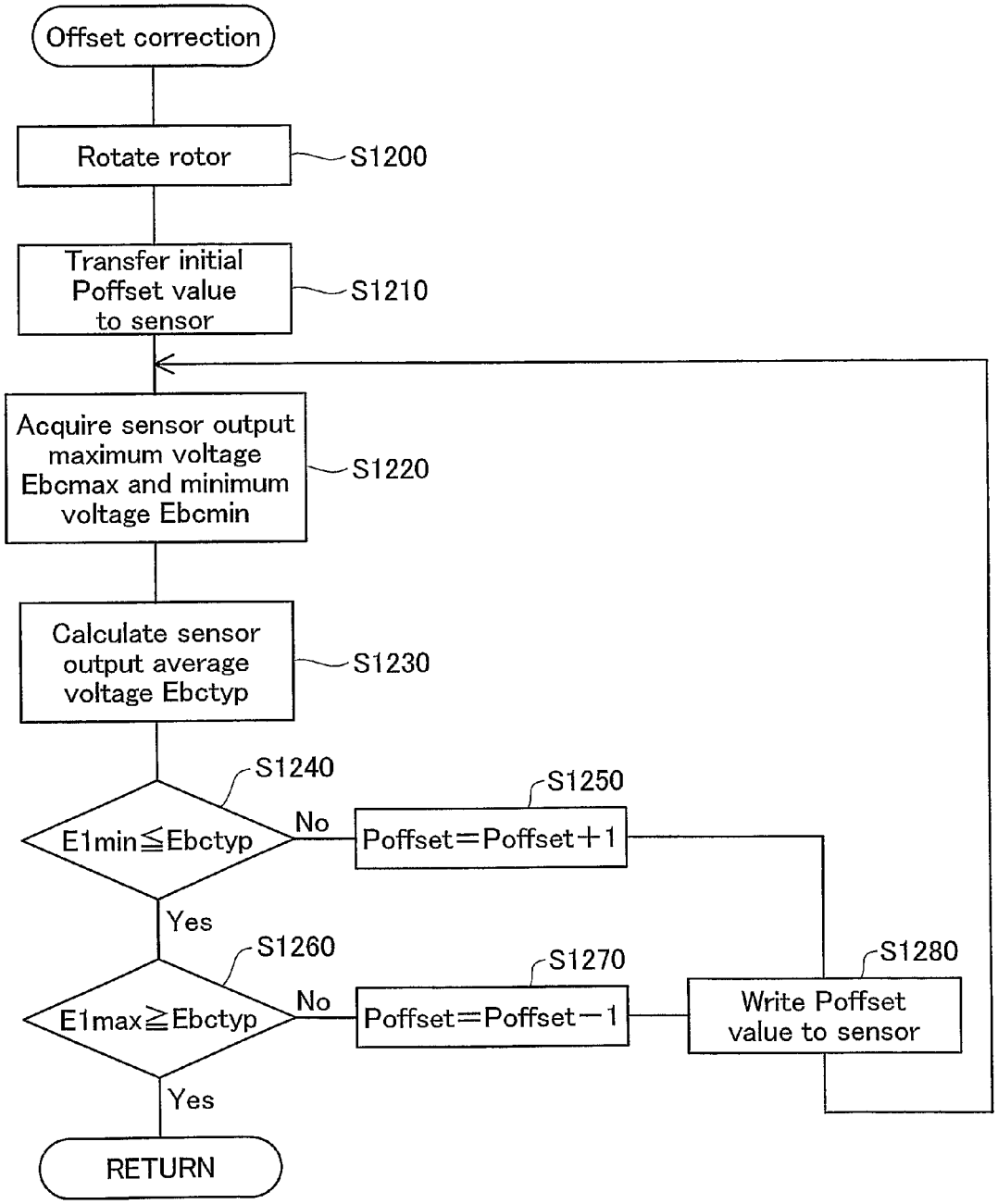
FIG. 24 is a flowchart depicting another procedure for carrying out offset correction.

FIG. 24 is a flowchart depicting another procedure for carrying out offset correction. In Step S1200, the CPU 220 rotates the rotor 30. In the procedure of FIG. 24, with the rotor 30 continuing to rotate, the CPU 220 executes offset correction beginning with Step S1210. In Step S1210, an initial value of offset Poffset is sent from the drive control circuit 200 to the magnetic sensor 16A, and is stored in the offset memory 440 (FIG. 9) of the magnetic sensor 16A. This process is the same as Step S220 of FIG. 19.

In Step S1220, the maximum voltage Ebcmax and minimum voltage Ebcmin of sensor output are acquired. These voltages Ebcmax, Ebcmin correspond to the upper peak value and lower peak value of the sensor output SSup (or SSdown) shown in FIG. 16B, for example. In Step S1230, an average value Ebctyp of the maximum voltage Ebcmax and minimum voltage Ebcmin is calculated. This average value Ebctyp is a voltage value corresponding to the middle point of the sensor output waveform.

Steps S1240 to S1280 are substantially identical to Steps S240 to S280 of FIG. 19, but with the average value Ebctyp mentioned above replacing the voltage value Ebc of FIG. 19. Specifically, in Steps S1240 to S1280, the offset value Poffset is adjusted so that the average value Ebctyp lies within the permissible range shown in FIG. 16B.

As will be understood from this example, it is also possible for offset correction to be carried out utilizing the peak voltage of sensor voltage. In the procedure of FIG. 24, there is no need to position the rotor at a location corresponding to a point of interest of the sensor output waveform as in the procedure of FIG. 19, and a resultant advantage is that the correction operation is easier.

Figure 25:
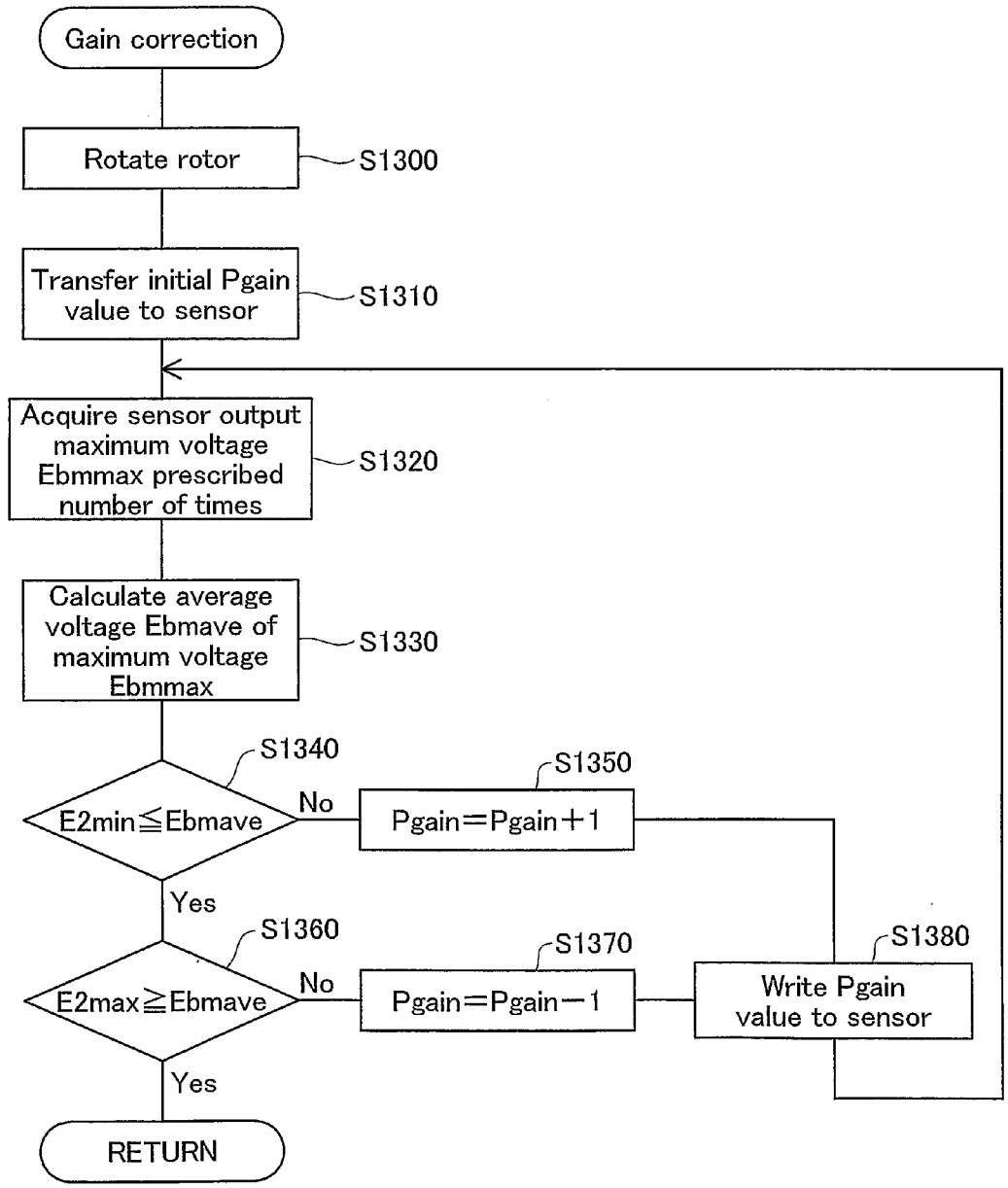
FIG. 25 is a flowchart depicting another procedure for carrying out gain correction.

FIG. 25 is a flowchart depicting another procedure for carrying out gain correction. In Step S1300, the CPU 220 rotates the rotor 30. In the procedure of FIG. 25, with the rotor 30 continuing to rotate, the CPU 220 executes gain correction beginning with Step S1310. In Step S1310, an initial value of gain Pgain is sent from the drive control circuit 200 to the magnetic sensor 16A, and is stored in the gain memory 450 (FIG. 9) of the magnetic sensor 16A. This process is the same as Step S320 of FIG. 20.

In Step S1320, the maximum voltage Ebmmax of sensor output is acquired a prescribed number of times. This maximum voltage Ebmmax corresponds, for example, to the upper peak value of the sensor output SSsmall shown in FIG. 17B (or SSlarge of FIG. 17C). Alternatively, instead of the upper peak value, the lower peak value may be acquired a prescribed number of times. The number of times that the upper peak value appears in the course of one revolution of the rotor is equal to one-half the pole number P of the motor. With the 6-pole motor depicted in FIGS. 1A to 1D, the upper peak value will appear three times in the course of one revolution. In Step S1320, in preferred practice maximum voltage Ebmmax will be sampled (P×N)/2 times. Here, N is a prescribed integer equal to 1 or greater, preferably 2 or greater. In Step S1230, an average value Ebmave is calculated for the (P×N)/2 sampled maximum voltages Ebmmax.

Steps S1340 to S1380 are substantially identical to Steps S340 to S380 of FIG. 20, but with the average value Ebmave mentioned above replacing the voltage value Ebm of FIG. 20. Specifically, in Steps S1340 to S1380, the gain value Pgain is adjusted so that the average value Ecmave lies within the permissible range shown in FIG. 17B.

In the procedure of FIG. 25, there is no need to position the rotor at a location corresponding to a point of interest of the sensor output waveform as in the procedure of FIG. 20, and a resultant advantage is that the correction operation is easier. Moreover, since gain correction is carried out using an average value of several peak voltages, it is possible to establish ideal gain in consideration of the multiple magnets overall.

Figure 26:
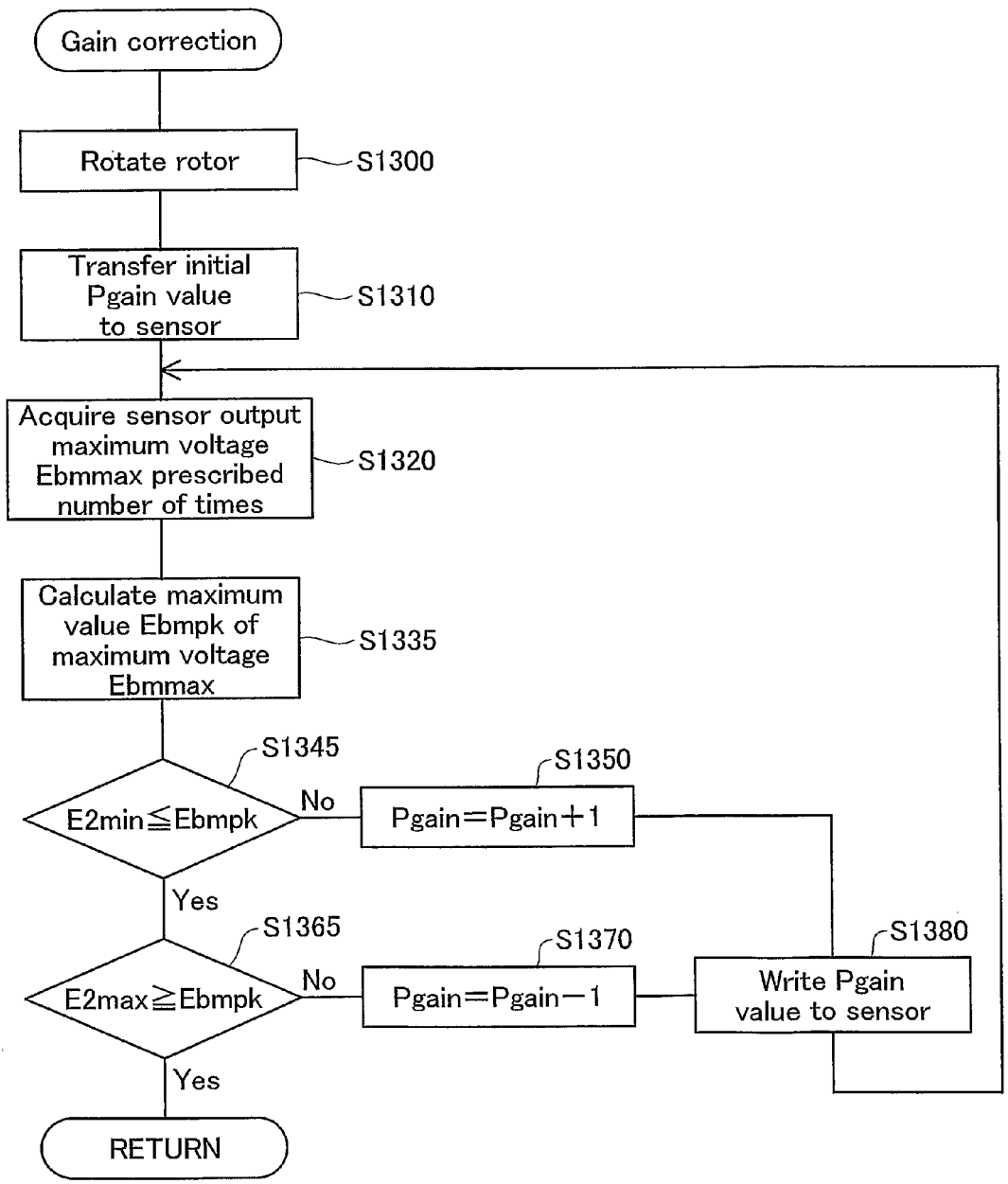
FIG. 26 is a flowchart depicting yet another procedure for carrying out gain correction.

FIG. 26 is a flowchart depicting yet another procedure for carrying out gain correction. In the procedure of FIG. 26, Steps S1330, S1340, and S1360 of FIG. 25 are replaced by Steps S1335, S1345, and S1365, but the procedure is otherwise the same as in FIG. 25.

In Step S1335, a maximum voltage Ebmpk is selected from among the (P×N)/2 maximum voltages Ebmmax. In Steps S1345 and S1365, gain correction is carried out using this maximum voltage Ebmpk. It is possible to derive appropriate gain correction values Pgain in this manner as well.

The values of the threshold values E2min and E2max used in Steps S1345 and S1365 of FIG. 26 can be different from those of the threshold values E2min and E2max used in Steps S1340 and S1360 of FIG. 25.

2. Embodiment 2

Figure 27:
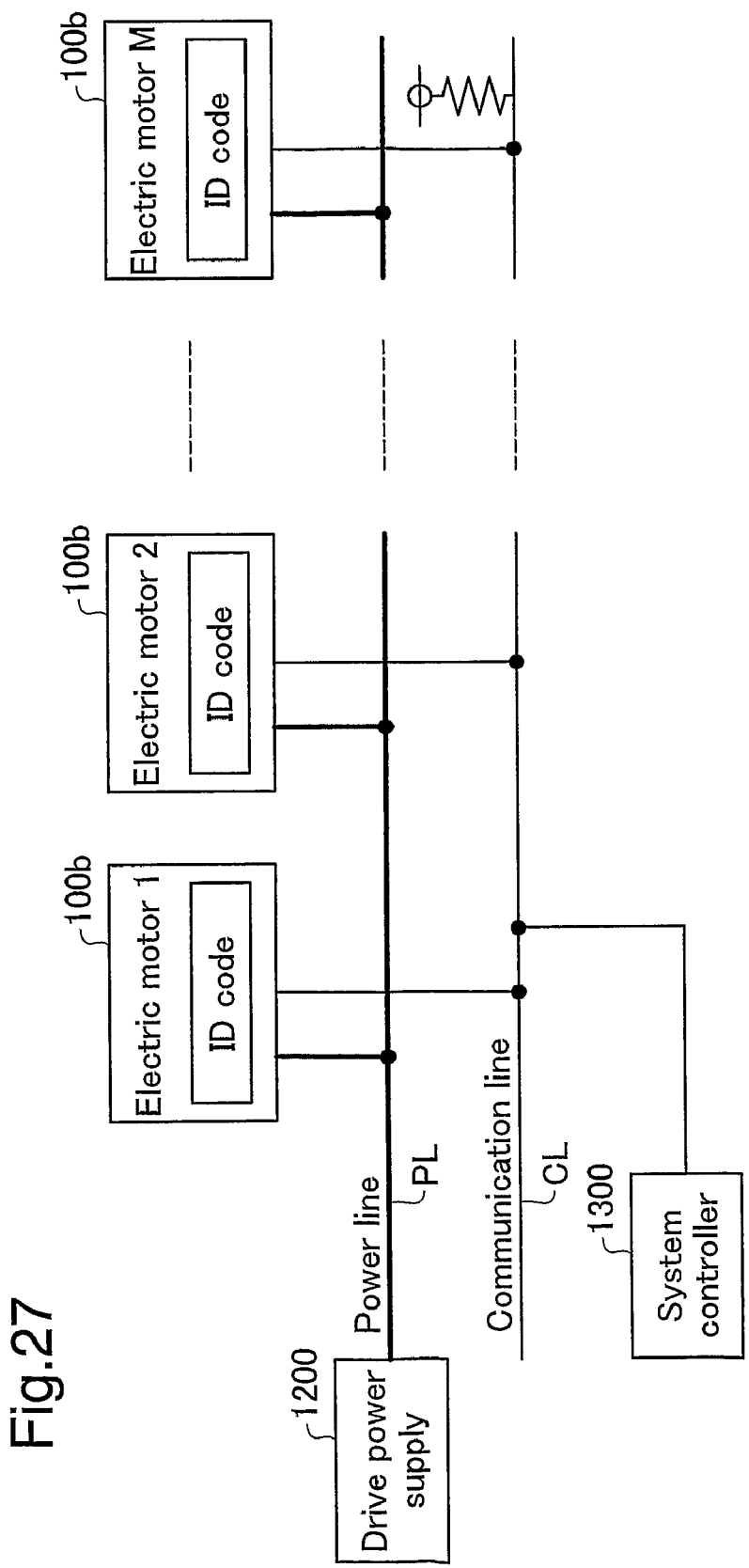
FIG. 27 is a block diagram depicting the configuration of the drive system in Embodiment 2.

FIG. 27 is a block diagram depicting the configuration of the drive system in Embodiment 2. This drive system is furnished with multiple electric motors 100b. Here, the number of motors is denoted by M where M is an integer equal to 2 or greater. The multiple electric motors 100b are connected to a drive power supply 1200 via a power line PL, and also connected to a system controller 1300 via a control line CL. The power line PL and the control line CL are shared by the multiple electric motors 100b. Alternatively, power lines PL may be individually connected to the motors.

Each of the electric motors 100b is assigned a unique ID code (identification code) identifying it from the other electric motors. As will be discussed later, the system controller

1300 uses this ID code to send commands to individual electric motors 100*b* via the control line CL.

Figure 28:
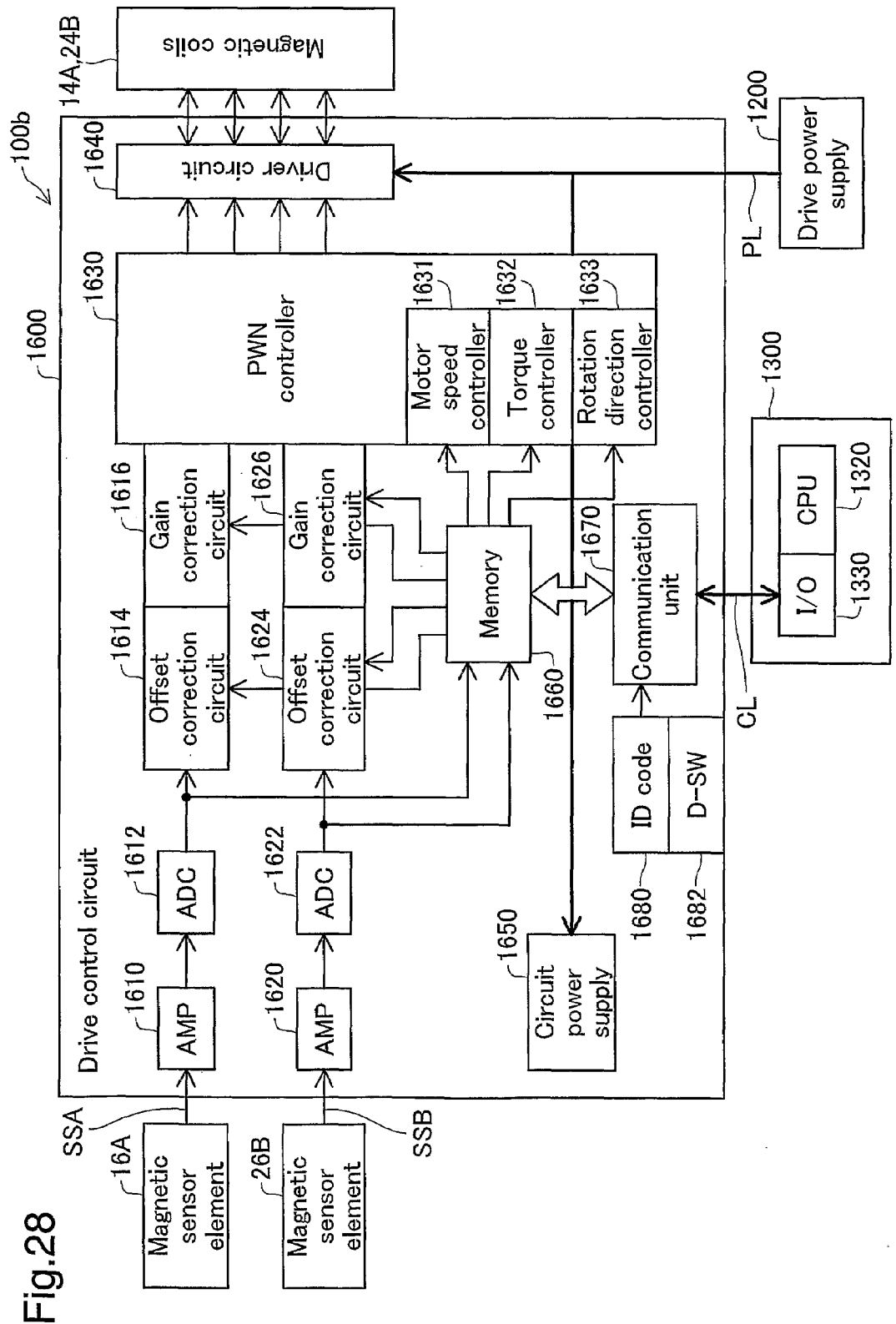
FIG. 28 is a block diagram depicting the configuration of the drive control circuit provided in each individual electric motor.

FIG. 28 is a block diagram depicting the configuration of the drive control circuit provided in each individual electric motor 10*b*. This drive control circuit 1600 uses sensor outputs of the analog magnetic sensors 16A, 26B in the electric motor 100*b* to generate AC drive signals for driving the magnet coils 14A, 24B. In Embodiment 2, two-phase brushless DC motors are used as the electric motors 100*b*; the suffixes "A" and "B" appended to the end of the symbols of the sensors 16A, 26B and the coils 14A, 14B denote use for Phase A and Phase B respectively. The configuration of the motor unit and the driving method can be the same as the configuration and driving method of Embodiment 1 described previously with reference to FIGS. 1A through 6D.

The drive control circuit 1600 has amplifiers 1610, 1620, AD converters 1612, 1622, offset correction circuits 1614, 1624, gain correction circuits 1616, 1626, a PWM controller 1630, a driver circuit 1640, a memory 1660, a circuit power supply 1650, a communication unit 1670, and an ID code register 1680. The offset correction circuits 1614, 1624 are circuits for executing offset correction of the sensor outputs SSA, SSB; the gain correction circuits 1616, 1626 are circuits for executing gain correction of the sensor outputs SSA, SSB. Here, offset correction and gain correction of the sensor outputs are the same as those described in Embodiment 1. It is possible to increase the efficiency of the motors by means of carrying out these correction operations. During the process for determining the offset correction value and the gain correction value (termed "calibration"), the outputs SSA, SSB of the sensors 16A, 16B are amplified by the amplifiers 1610, 1620, converted to digital signals by the AD converters 1612, 1622, then stored temporarily in the memory 1660 and presented to the system controller 1300 via the communication unit 1670.

The PWM controller 1630 is a circuit for executing PWM control utilizing the offset-corrected and gain-corrected sensor outputs, and generating drive signals. A motor speed controller 1631 provided to the PWM controller 1630 executes speed-priority control for the purpose of bringing the speed of the electric motor into line with target speed. A torque controller 1632 executes torque-priority control for the purpose of bringing the torque of the electric motor into line with target torque. A rotation direction controller 1632 executes control for the purpose of setting the rotation direction of the electric motor to that of either normal rotation or reverse rotation. The driver circuit 1640 is so-called H-bridge circuit. Motor torque can be detected using a sensor (not shown) that measures coil voltage and current. Motor speed and rotation direction can be detected using a rotation detection circuit (not shown) that detects speed and rotation direction from the output signals of the sensors 16A, 26B. As the PWM controller 1630, one identical to the PWM controller 240 of Embodiment 1 may be used.

The memory 1660 stores offset correction values and gain correction values relating to both the Phase A sensor 16A and the Phase B sensor 26B, as well as various settings used by the PWM controller 1630. Since it is preferable for offset correction values and gain correction values to be held even when the power is shut off, the part of the memory used to store these values will preferably be constituted as nonvolatile memory.

The communication unit 1670 is coupled to the I/O interface 1330 of the system controller 1300 via the communication line CL. Besides this interface 1330, the system controller 1300 also includes a CPU 1320 and a memory, not shown.

On the basis of a computer program, the CPU 1320 executes various control processes, discussed later.

In the ID code register 1680, a ID code identifying the individual electric motor is recorded, or an ID code is set by means of an external switch. In the example of FIG. 28, it is possible to set the ID code using a DIP switch 1682. However, it is possible for the ID code to be recorded or set in the motor by any of various other means besides a DIP switch. For example, it is possible to eliminate the DIP switch and instead construct the ID code register 1680 from nonvolatile memory. Using this ID code, individual communication is possible between the system controller 1300 and the communication unit 1670 of each electric motor. The specific communication method will be discussed later.

Figure 29:
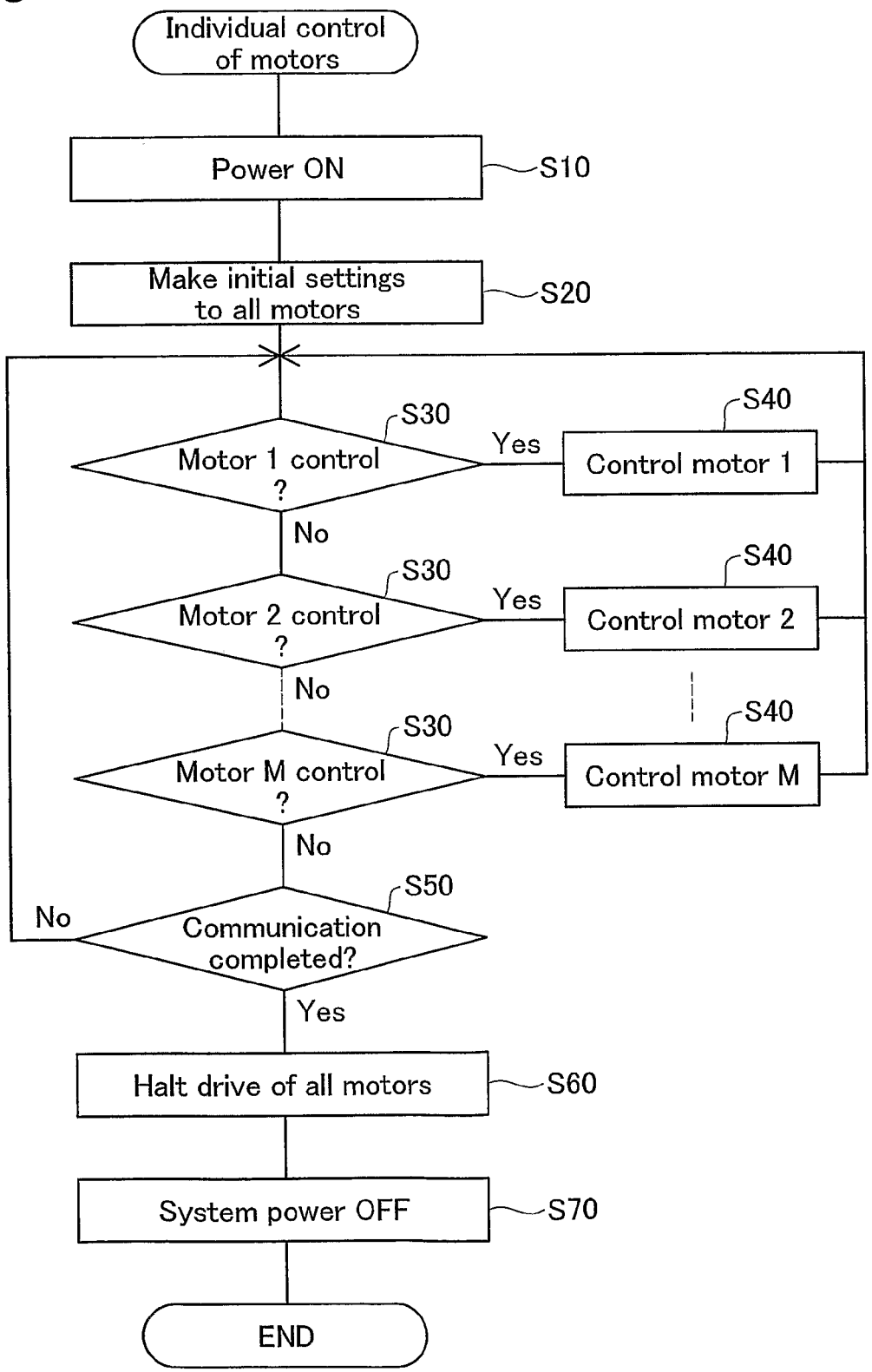
FIG. 29 is a flowchart illustrating the procedure for individual control of a motor.

FIG. 29 is a flowchart illustrating the procedure for individual control of a motor in Embodiment 2. In Step S10, power to the entire system is switched on by the user, whereupon in Step S20 the system controller 1300 makes initial settings for the individual motors. For example, various coefficients or constants (e.g. upper limit motor speed etc.) used for control within each motor, as well as initial operational parameters (parameters representing target motor speed, target torque, rotation direction etc.), may be set by way of these initial settings. During the initial setting process, the system controller 1300 transmits the initial settings together with the ID of the individual motor, thereby establishing the initial settings for the individual motor.

In Steps S30 and S40, the system controller 1300 selects any one of the M motors, and by sending a control command or control instruction to the selected motor executes control of that motor. As control commands, it is possible to use commands instructing change of target motor speed, change of target torque, change of rotation direction, start/stop of braking or regeneration, stop of the motor, and so on. In Step S30 the system controller 1300 determines which of the M motors is to be controlled, and in Step S40 sends a control command to that motor. The control procedure within each motor at this time will be discussed later.

In Step S50, when communication with the selected motor is completed, the routine returns to Step S30, and Steps S30 and S40 are executed again. In the event that the drive system is to be stopped, in Step S60 the system controller 1300 sends to the motors a command to halt driving of all motors. Then, in Step S70, power to the system is turned off by the user.

Figure 30:
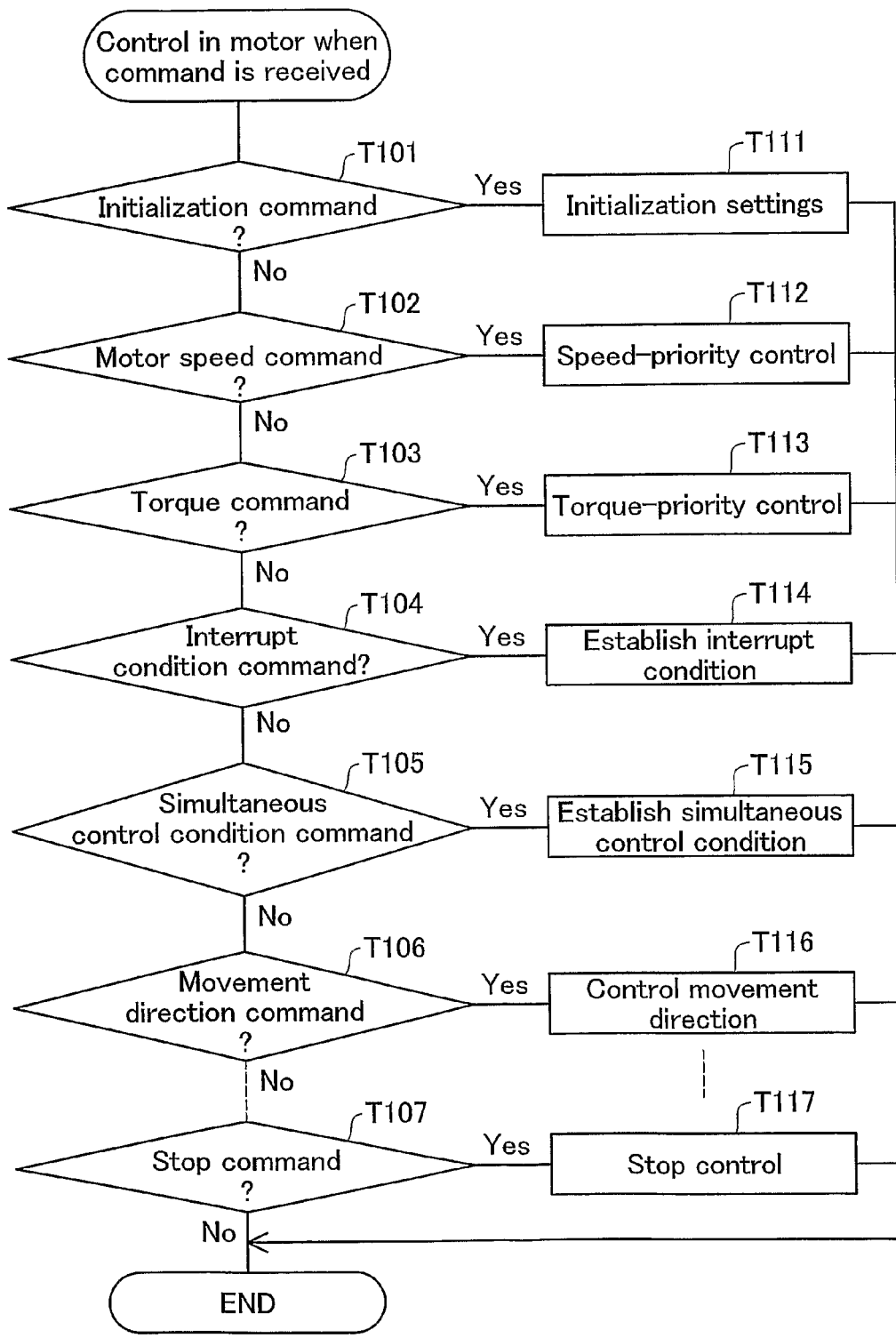
FIG. 30 is a flowchart illustrating the control procedure in an individual motor when a command is received.

FIG. 30 is a flowchart illustrating the control procedure in an individual motor when a command is received. In Steps T101-T107, the communication unit 1670 (FIG. 28) in the motor determines the type of command which has been received; and in Steps T111-T117 the communication unit 1670 or the PWM controller 1630 executes the control or setting specified by the command. The various settings are stored in the memory 1660.

For individual control of a motor, commands, such as the seven commands listed below for example, can be sent to individual motors from the system controller 1300.

(1) Initialization command: a command establishing various coefficients or constants (e.g. upper limit motor speed etc.) used for control within individual motors, as well as initial operational parameters (parameters representing target motor speed, target torque, rotation direction etc.).

(2) Motor speed command: where speed-priority control is executed, a command for changing the target motor speed.

(3) Torque command: where torque-priority control is executed, a command for changing the target torque.

(4) Interrupt condition command: a command stipulating an event (such as going above the upper limit current) in relation to which an interrupt request will be issued to the system controller 1300 by an individual motor.

(5) Simultaneous control condition command: a command establishing for individual motors a control sequence for use in simultaneous control mode of multiple motors, discussed later.

(6) Movement direction command: a command for changing the rotation direction of the motor.

(7) Stop command: a command for stopping the motor.

Figure 31:
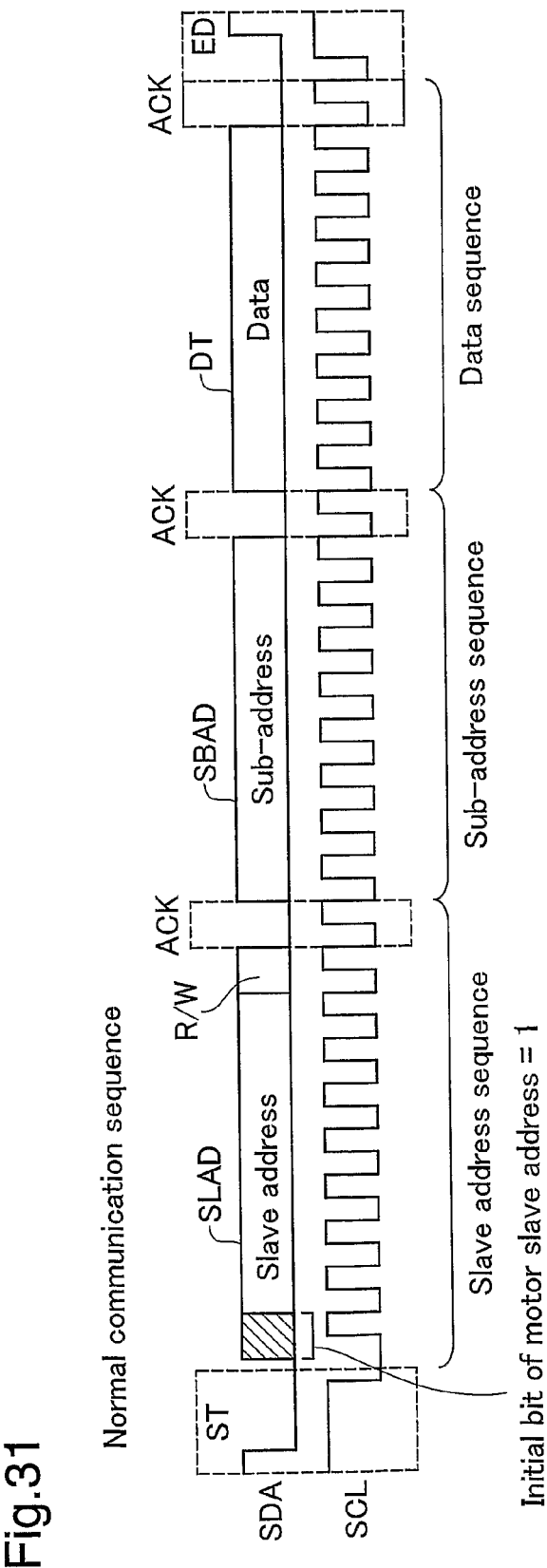
FIG. 31 is a timing chart showing a communication sequence in individual control mode.

FIG. 31 is a timing chart showing a communication sequence that uses the communication line CL. This communication sequence is utilized in individual motor control mode. In the present embodiment, the communication line CL is a 2-wire serial communication line composed of a serial data line SDA and a serial clock line SCL. Such a serial communication line may be achieved using the $I^2C$ bus (trademark of Phillips), for example. However, since the simultaneous control mode to be discussed later is not specified in the $I^2C$ bus Specification, the protocol of this part is modified. During communication via the communication line CL, the system controller 1300 functions as the master device, and the individual motors function as slave devices.

During transmission of data between the system controller 1300 and an individual motor, the motor address and data are transmitted in sync with the serial clock SCL, between a Start command ST and End command ED. A Start command ST is issued by dropping the serial data SDA to Low while the serial clock SCL is High. An End command ED is issued by dropping the serial data SDA to Low while the serial clock SCL is Low, and subsequently while the serial clock SCL is High, raising the serial data SDA to High.

After the Start command ST is issued, a 7-bit slave address SLAD and a 1-bit transmission direction R/W are sent. Slave addresses SLAD are addresses for identifying an individual motor, and are associated on a one-to-one basis with the ID codes established in the motors. Various methods may be employed for making these associations, for example, the entire slave address SLAD may be set to the same value as the ID code of the individual motor; or several lower bits of the slave address SLAD may be set to the same value as the ID code of the individual motor. In the event that the entire slave address SLAD is not identical to the ID code, the association between the two will be stored in advance in the memory 1660 in the motor. The slave address SLAD can be considered as substantially identical to the ID code. "Identification code" is used herein in a sense including those that, as is the case with this slave address SLAD, are associated on a one-to-one association with the ID codes in the motors and that can be viewed the same as the ID codes in the motors.

In Embodiment 2, the initial bit of the slave address SLAD is set to a value of 1. This is for the purpose of implementing simultaneous control, to be described later.

The transmit direction R/W which is sent after the slave address SLAD is set Low (WRITE) in the event that data is to be sent from the system controller 1300 (master) to individual motors (slaves); and conversely is set to High (READ) when data is sent from motors to the system controller 1300. After the transmit direction R/W, the motor specified by the slave address SLAD responds with an acknowledgement ACK.

In the example of FIG. 31, an 8-bit sub-address SBAD is transmitted following the acknowledgement ACK after the transmit direction R/W. It is possible for this sub-address SBAD to be used for identifying data of various kinds stored in the memory 1660 of the motor, for example. However, the sub-address SBAD may be omitted. After the sub-address SBAD, the motor responds with another acknowledgement ACK.

Once the addresses of motors have been specified in this manner, data DT is subsequently transmitted between the motors and the system controller 1300, followed by still another acknowledgement ACK. Data DT sent from the system controller 1300 to individual motors may contain the various commands described in FIG. 30. On the other hand, Data DT sent from the individual motors to system controller 1300 may contain the settings that have been made for each motor, operating parameters (speed, rotation direction, torque etc.) detected by the sensors in each motor, interrupts to the system controller 1300.

In Embodiment 2, where commands are sent to individual motors by the system controller 1300 in this way, since commands are sent together with identification codes (slave addresses) for the individual motors, it is possible to individually control multiple motors via a shared communication line CL. Moreover, since the system controller 1300 can acquire data from the individual motors, it is possible to check the operational status and settings of individual motors.

Figure 32:
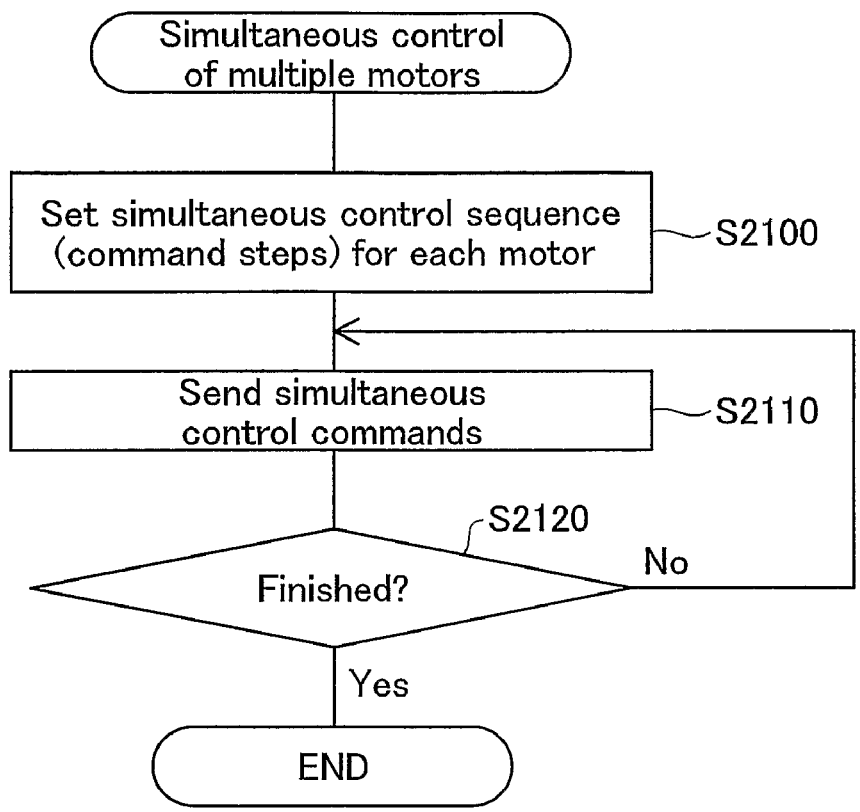
FIG. 32 is a flowchart illustrating the procedure of simultaneous control of multiple motors.

FIG. 32 is a flowchart illustrating the procedure of simultaneous control of multiple motors. In Step S2100, the system controller 1300 sets up a control sequence for the motors in simultaneous control mode.

Figure 33:
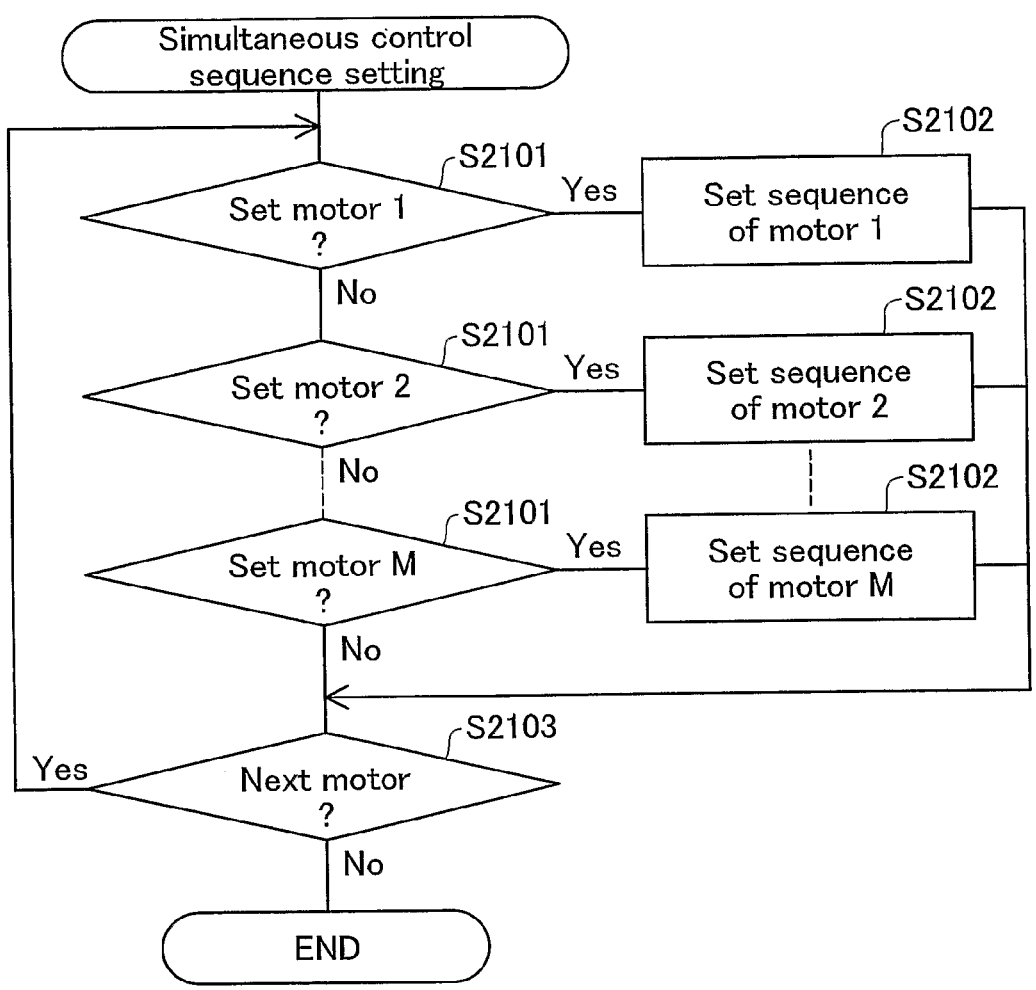
FIG. 33 is a flowchart illustrating in detail the procedure of Step S100.

FIG. 33 is a flowchart illustrating in detail the procedure of Step S2100. In Steps S2101-S2103, the system controller 1300 selects the M motors sequentially one at a time and sends a simultaneous control condition command, setting up the control sequence for the motors in simultaneous control mode.

FIGS. 34A and 34B show exemplary simultaneous control sequences. The simultaneous control mode is also called "common control mode." In Example 1 shown in FIG. 34A, a control sequence composed of N+1 command steps STEDN is established for each of the M motors. Here, "command steps STEDN" refer to control steps for sequential execution in a time series, when carrying out simultaneous control. In simultaneous control mode, motor control starts from STEDN=0 and ends at STEDN=N. Here, N denotes an integer of 1 or more. The M motors simultaneously execute the operations specified by a given command step STEDN. For example, when STEDN=0, Motor 1 undergoes reverse rotation, Motor 2 undergoes forward rotation, and the other motors remain stopped. When STEDN=1, Motor 1 maintains reverse rotation, Motor 2 brakes (or regenerates), Motor 3 starts forward rotation, and motor M executes braking (or regeneration). The command step STEDN is updated or incremented in each motor each time that a simultaneous command or shared command, discussed later, is issued by the system controller 1300.

In Example 2 shown in FIG. 34B, the M motors carry out the same operation in each command step. As will be understood from these examples, it is possible to program mutually independent sequences for the individual motors, or to program an identical sequence for all of the motors. Simultaneous control sequences such as these are set up in the memory 1660 of each motor. A simultaneous control sequence for M motors is termed "a simultaneous control sequence set." In preferred practice the system controller 1300 will store in its memory (not shown) one or more simultaneous control sequence sets. Where multiple simultaneous control sequence sets are stored, it will be possible to selectively implement simultaneous control of various kinds.

Simultaneous control sequences may be stored in the memory in each motor, rather than being stored in the system controller 1300. With this arrangement, it is possible for the system controller 1300 to easily select the control sequence to be used, by specifying, at the outset of simultaneous control mode, which of the multiple sets of sequences is to be used.

Once simultaneous control sequences have been established respectively for the individual motors, control in simultaneous control mode is executed in accordance with the commands discussed below.

Figure 35:
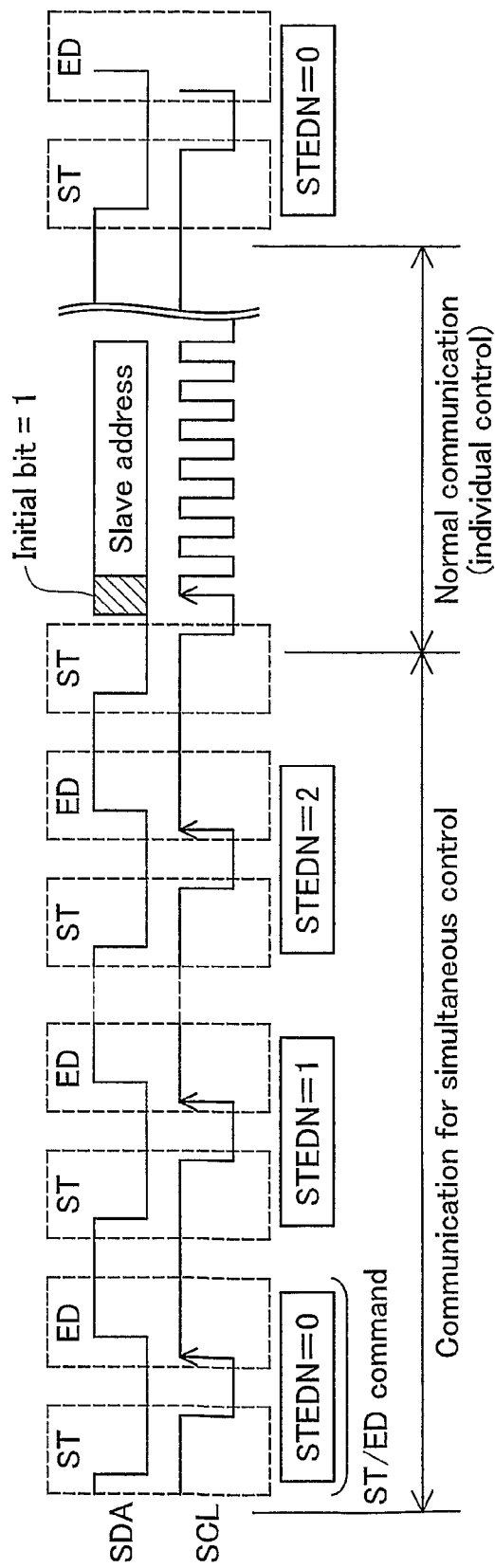
FIG. 35 is a timing chart showing the communication sequence in simultaneous control mode.

FIG. 35 is a timing chart showing the communication sequence in simultaneous control mode. When simultaneous control is to be executed, the system controller 1300 issues a Start command ST followed by an End command ED. In contrast to the normal communication sequence illustrated in FIG. 31 in which addresses and data are issued between the Start command ST and the End command ED, during execution of simultaneous control, addresses and data are not issued between the Start command ST and the End command ED. Hereinafter such a set of commands ST and ED without accompanying addresses and data will be termed an "ST/ED command," or in some instances "simultaneous control commands" or "shared commands." When the motors initially receive an ST/ED command, the command step STEDN in each motor is set to 0, and control established by STEDN=0 (see FIG. 34A or 34B) is executed. Subsequently, each time that the system controller 1300 issues an ST/ED command, the multiple motors respectively increment the command step STEDN, and execute control established by the command step STEDN.

FIG. 35 depicts an exemplary case in which simultaneous control terminates at STEDN=2, with individual control of motors executed thereafter. In Embodiment 2, since the initial bit of the slave addresses of all motors is set to 1, in the event that slave addresses are issued after a Start command ST, each motor will immediately become aware that the current mode is no longer the simultaneous control mode. Consequently, each motor can immediately distinguish between the individual control mode and the simultaneous control mode. Moreover, it is possible for the system controller 1300 to clearly distinguish between the individual control mode and the simultaneous control mode, and easily execute them.

It is also possible to use any other method as the method for distinguishing between the individual control mode and the simultaneous control mode. In preferred practice, however, identification codes for individual motors will not be transmitted during the simultaneous control mode. For example, in the simultaneous control mode, simultaneous control commands may be transmitted together with a so-called shared identification code (a code that the motors can recognize as being transmitted to all motors), instead of transmitting identification codes of individual motors.

Figure 36:
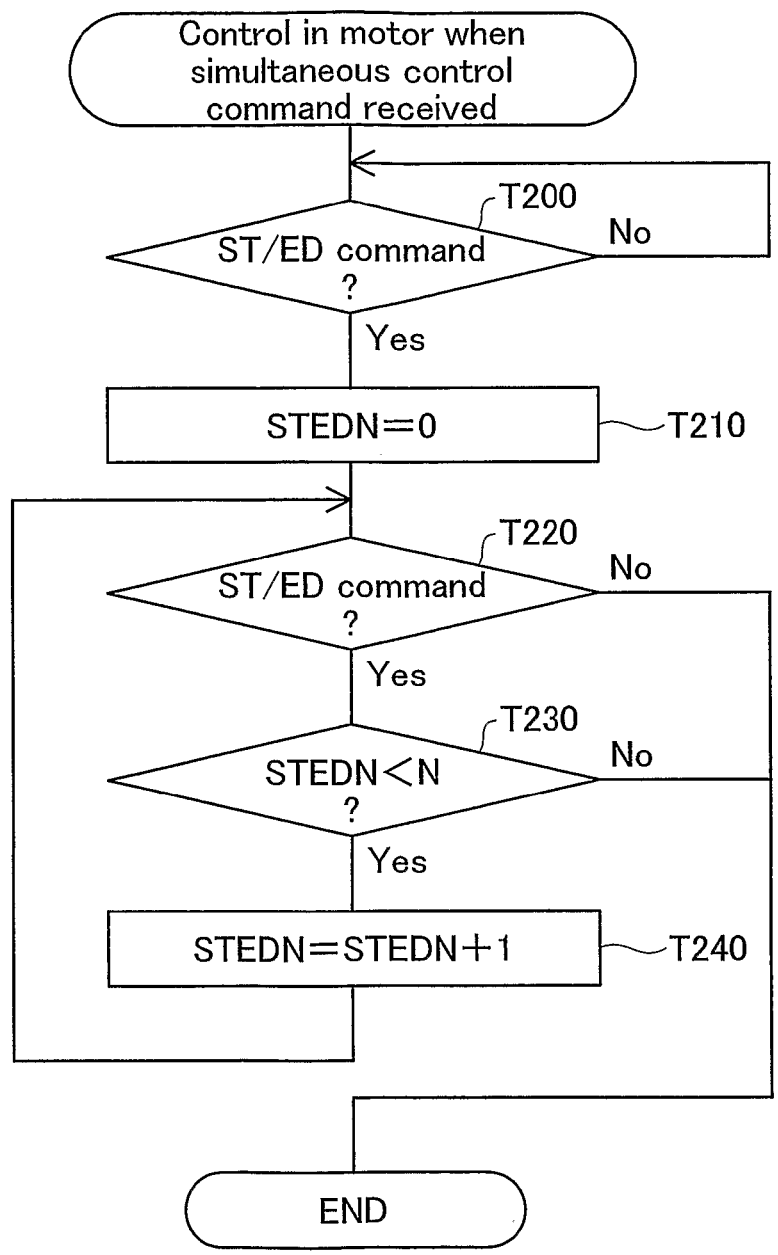
FIG. 36 is a flowchart illustrating the control procedure in a motor when a simultaneous control command is received.

FIG. 36 is a flowchart illustrating the control procedure in a motor when a simultaneous control command (ST/ED command) is received. Once the ST/ED command is initially received in Step T200, the command step STEDN is set to 0 in Step S210. Subsequently, when a simultaneous control command (ST/ED command) is received in Step T220, a determination is made as to whether the command step STEDN in each motor has reached the maximum value N; if the maximum value N has not been reached, the command step STEDN is incremented in Step T240. If on the other hand the maximum value N has been reached, the simultaneous control mode now terminates. In Steps T210 and T240, the PWM controllers 1630 in the motors respectively execute the control content established by the command step STEDN.

As discussed above, in Embodiment 2 it is possible for both individual control of motors and simultaneous control of multiple motors to be implemented by means of transmitted commands from the system controller 1300 to the multiple motors using a shared communication line CL. During individual control of motors, it is possible to select only a motor whose operational status needs to be changed, and change only operation of that particular motor. During simultaneous control of motors, on the other hand, since the operations of the multiple motors can be changed simultaneously (i.e. at identical timing), it is possible to easily achieve coordinated control of the multiple motors.

Figure 37:
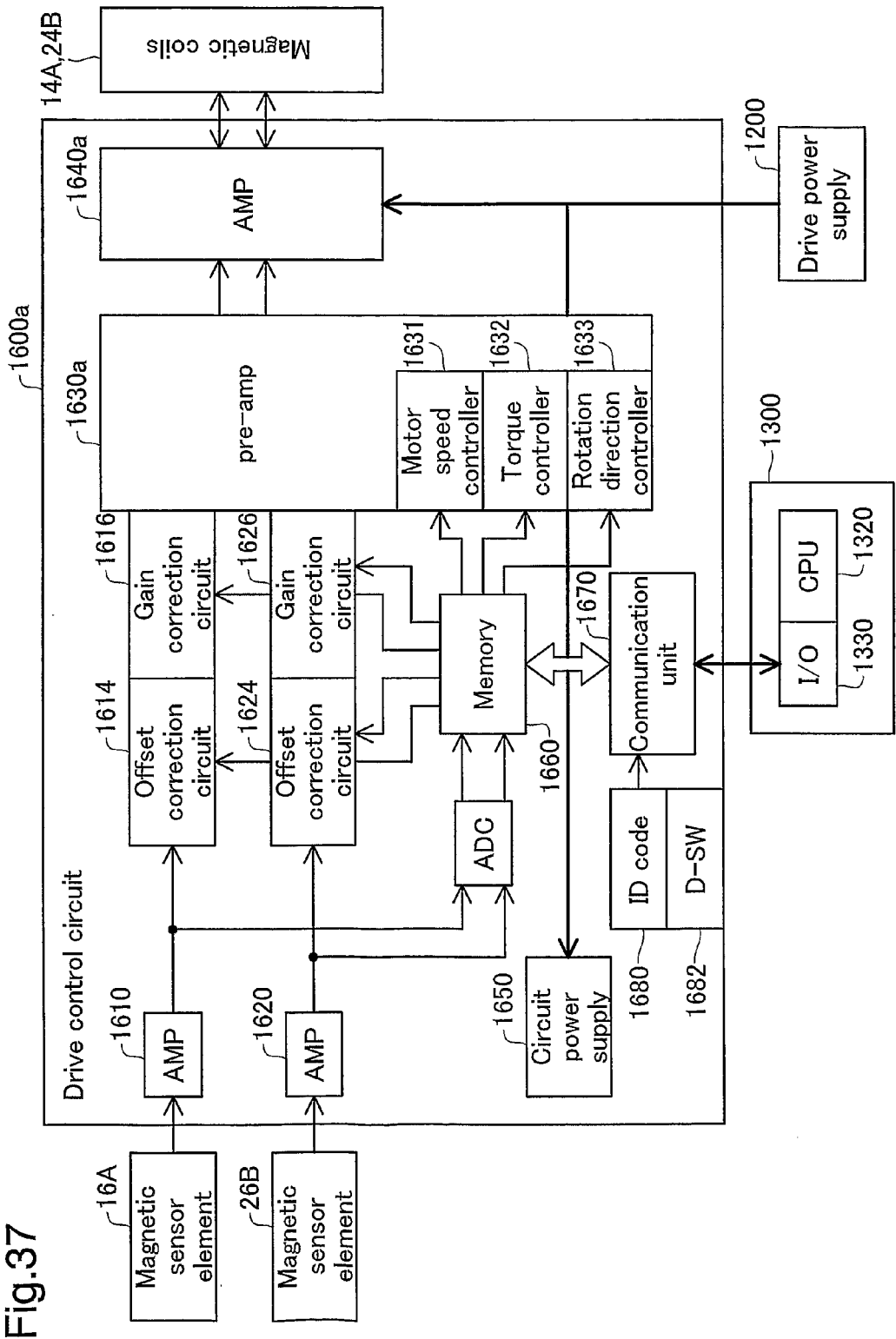
FIG. 37 is a block diagram depicting another configuration of the drive control circuit.

FIG. 37 is a block diagram depicting another configuration of the drive control circuit in Embodiment 2. In this drive control circuit 1600a, the PWM controller 1630 and the driver circuit 1640 (H-bridge circuit) of the circuit 1600 shown in FIG. 28 are replaced by a pre-amplifier 1630a and an amplifier 1640a; the configuration is otherwise the same as in FIG. 28. The pre-amplifier 1630a and the amplifier 1640a generate a drive signal by amplifying in unmodified form the corrected analog sensor outputs. Where the sensor outputs are amplified using an analog circuit without PWM control in this way, it is possible to run the motors at high efficiency by carrying out correction of the sensor waveform discussed previously.

Figure 38:
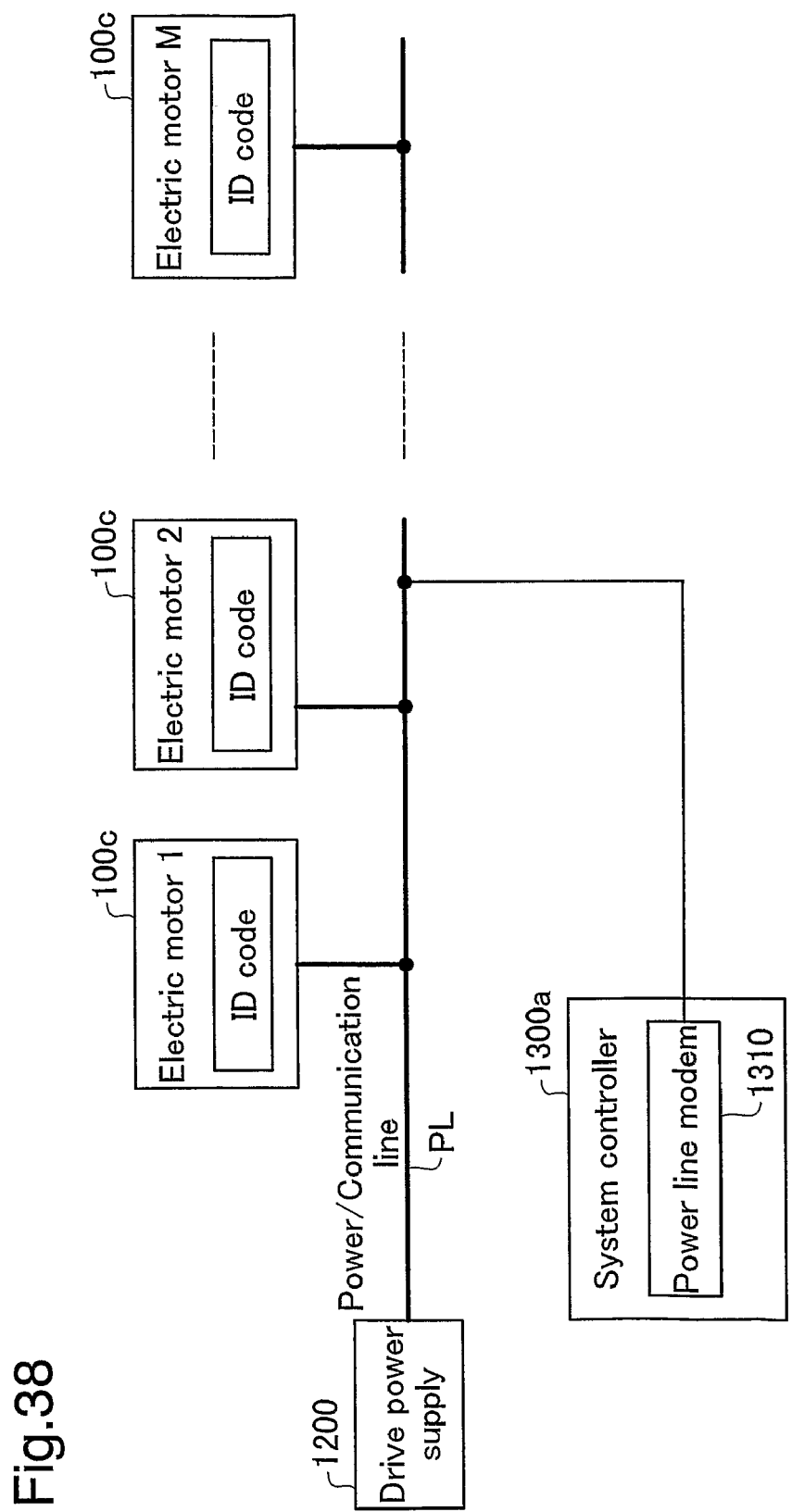
FIG. 38 is a block diagram depicting another configuration of the drive system.

FIG. 38 is a block diagram depicting another configuration of the drive system. In this drive system, multiple electric motors 100c are connected to a system controller 1300a via a shared power line PL. The system controller 1300a is furnished with a power line modem 1310 for carrying out communication using the power line PL.

Figure 39:
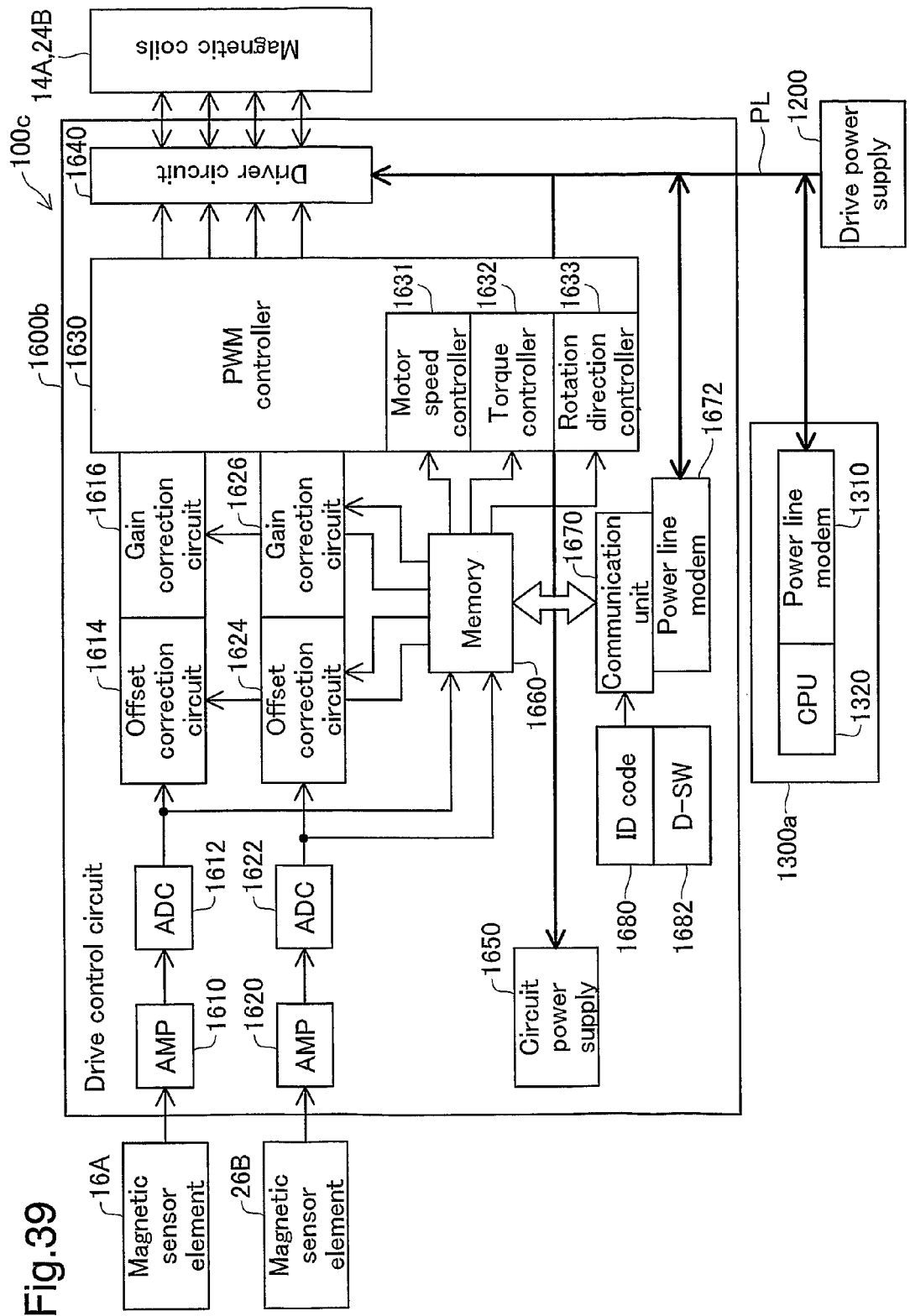
FIG. 39 is a block diagram depicting the configuration of the electric motor drive control circuit of the drive system shown in FIG. 38.

FIG. 39 is a block diagram depicting the configuration of the electric motor drive control circuit for the drive system shown in FIG. 38. This drive control circuit 1600b has the same configuration as in FIG. 28, except that a power line modem 1672 has been added to the circuit 1600 shown in FIG. 28. In this way, it is possible to build a drive system using the power line PL as a shared communication line.

3. Modification Examples

The present invention is not limited to the embodiments described hereinabove, and may be reduced to practice in various other ways without departing from the spirit thereof. Modifications such as the following would be possible, for example.

Modification Example 1

In the preceding embodiments, it is assumed that both gain correction and offset correction are performed by way of correction of the sensor output waveform; however, it is possible to correct only one of these instead. Alternatively, sensor output waveform may be corrected to desired waveform shape using some other type of correction besides these. In the preceding embodiments the sensor output and back electromotive force waveforms are assumed to be sine waves; however, it is also possible for the invention to be implemented in cases where these waveforms differ somewhat from sine waves.

It is also possible for the electric motors used in the drive system to be motors that do not perform offset correction and gain correction of sensor output.

Modification Example 2

While analog magnetic sensors are employed in the preceding embodiments, it is possible to use digital magnetic sensors having multi-value analog output, instead of analog magnetic sensors. Like analog magnetic sensors, digital magnetic sensors having multi-value analog output also have an output signal that changes in analog fashion. Herein, an "output signal that changes in analog fashion" refers in the broad sense to include both analog output signals, and multilevel digital output signals having three or more levels, not On/Off binary output.

Modification Example 3

In Embodiment 1, a drive control circuit for calibration and a drive control circuit for actual use are employed respectively, but it is possible instead to employ the drive control circuit for actual use as-is during calibration as well, and to connect the calibration circuit to the connector 90. Any circuit having the function of registering corrected values of sensor output waveforms in the motor can be used as this calibration circuit.

Modification Example 4

It is possible to employ for the PWM circuit or PWM controller various circuit configurations besides that shown in FIG. 10. For example, it is possible to use a circuit that perform's PWM control by comparing sensor output with a triangular reference wave. In this case, during PWM control the gain of the sensor outputs will be adjusted according to the preferred application voltage; this gain adjustment differs from the gain correction described in FIG. 17. In other words, the gain correction described in FIG. 17 entails correction for the purpose of adjusting the sensor outputs to the desired waveform irrespective of the desired application voltage level.

Modification Example 5

In Embodiment 2 discussed previously, a drive system capable of independent control of a motor and simultaneous control of multiple motors are discussed; however, the present invention may be implemented in a drive system capable of executing either independent control or simultaneous control, or both.

Modification Example 6

In Embodiment 2 discussed previously, prior to initiating simultaneous control, a sequence for simultaneous control is set up in each motor; however, it is possible to execute simultaneous control by some other methods. For example, it is possible to execute simultaneous control by simultaneously transmitting given operational parameters to multiple motors, using shared commands. By means of such a configuration, the multiple motors will be made to execute the same operation simultaneously.

Also, where simultaneous control of multiple motors is performed, it is not necessary to simultaneously control all of the motors contained in the system, and to instead control only a certain plurality of motors selected from among them. With this arrangement, it is possible to simultaneously control and operate a certain plurality of motors, while causing the other motors to continue their respective operations. It is therefore possible to implement more complex driving in the system as a whole.

Modification Example 7

In the preceding embodiments, six-pole, two-phase brushless DC motors are described, but it is possible to implement the invention with electric motors of various kind other than this. For example, the pole number and phase number may be any arbitrarily selected integers. It is also possible to employ a mix of different types of motors as the multiple electric motors making up the drive system.

INDUSTRIAL APPLICABILITY

The present invention is applicable to motors, actuators employing motors, and drive systems equipped with multiple motors or actuators.

The invention claimed is:

1. An electric motor comprising:
a coil array having a plurality of magnetic coils;
a magnet array having a plurality of permanent magnets;
a plurality of magnetic sensors each outputting an output signal that changes in analog fashion depending on relative location of the magnet array and the coil array;
a drive control circuit that, utilizing analog change in the output signals of the plurality of magnetic sensors, generates application voltage for application to the coil array; and
an output waveform correcting unit configured to respectively correct waveforms of the output signals of the plurality of magnetic sensors such that the output signals of the magnetic sensors assume a prescribed waveform shape during operation of the electric motors;
wherein the output waveform correcting unit has a memory for storing output waveform correction values,
ID codes are assigned respectively to the plurality of magnetic sensors, and
the output waveform correcting unit receives from an external device an output waveform correction value for each magnetic sensor, together with the ID code for each magnetic sensor, and stores the output waveform correction value for each magnetic sensor in the memory.

2. The electric motor according to claim 1, wherein
the output waveform correcting unit executes gain correction and offset correction of the output signal of each magnetic sensor.

3. The electric motor according to claim 2, wherein
the memory of the output waveform correcting unit includes a nonvolatile memory for storing gain correction values and offset correction values as the output waveform correction values.

4. The electric motor according to claim 3, further comprising:
a communication unit configured to exchange the output waveform correction values and the ID codes of the magnetic sensors with the external device.

5. The electric motor according to claim 1, further comprising:
a communication unit configured to exchange the output waveform correction values and the ID codes of the magnetic sensors with the external device.

6. The electric motor according to claim 2, further comprising:
a communication unit configured to exchange the output waveform correction values and the ID codes of the magnetic sensors with the external device.

7. A drive system comprising:
a plurality of electric motors each including a coil array having a plurality of magnetic coils; a magnet array having a plurality of permanent magnets; a plurality of magnetic sensors each outputting an output signal that changes in analog fashion depending on relative location of the magnet array and the coil array; a drive control circuit that, utilizing analog change in the output signals of the plurality of magnetic sensors, generates application voltage for application to the coil array; and an output waveform correcting unit configured to respectively correct waveforms of the output signals of the plurality of magnetic sensors such that the output signals of the magnetic sensors assume a prescribed waveform shape during operation of the electric motors; wherein the output waveform correcting unit has a memory for storing output waveform correction values, ID codes are assigned respectively to the plurality of magnetic sensors, and the output waveform correcting unit receives from an external device an output waveform correction value for each magnetic sensor, together with the ID code for each magnetic sensor, and stores the output waveform correction value for each magnetic sensor in the memory; and a system controller coupled to the plurality of electric motors via a shared communication line;

wherein the drive control circuit of each electric motor has an identification code register that stores an identification code to identify each electric motor, and the system controller has an individual control mode in which operation of an individual electric motor is controlled by transmitting a command to the individual electric motor together with the identification code via the shared communication line.

8. The drive system according to claim 7, wherein the system controller further has a simultaneous control mode for simultaneously controlling operation of the plurality of electric motors, by transmitting via the shared communication line a shared command that is shared by the plurality of electric motors.

9. The drive system according to claim 8, wherein the system controller, when transmitting the shared command to the plurality of electric motors, transmits the shared command without transmitting the identification codes.

10. The drive system according to claim 9, wherein the system controller is capable of transmitting commands to individual electric motors together with the identification codes via the shared communication line prior to transmitting the shared command, thereby establishing in the drive control circuit of the individual electric motors a simultaneous control sequence composed of a plurality of control steps arranged in a time sequence, and each electric motor updates the control step of the simultaneous control sequence each time that the shared command is received from the system controller, and executes operation according to the updated control step.

11. The drive system according to claim 9, wherein the communication line is a serial communication line that transmits addresses and commands over the same data line, and the identification codes of the electric motors are associated on a one-to-one basis with addresses of the electric motors transmitted by the system controller via the communication line, whereby the addresses of the electric motors function as identification codes of the electric motors.

12. The drive system according to claim 9, wherein the system controller is capable of acquiring operational parameters or settings from individual electric motors via the communication line.

13. The drive system according to claim 8, wherein the system controller is capable of transmitting commands to individual electric motors together with the identification codes via the shared communication line prior to transmitting the shared command, thereby establishing in the drive control circuit of the individual electric motors a simultaneous control sequence composed of a plurality of control steps arranged in a time sequence, and each electric motor updates the control step of the simultaneous control sequence each time that the shared command is received from the system controller, and executes operation according to the updated control step.

14. The drive system according to claim 13, wherein mutually different sequences are established in the plurality of electric motors as the simultaneous control sequence.

15. The drive system according to claim 14, wherein the communication line is a serial communication line that transmits addresses and commands over the same data line, and the identification codes of the electric motors are associated on a one-to-one basis with addresses of the electric motors transmitted by the system controller via the communication line, whereby the addresses of the electric motors function as identification codes of the electric motors.

16. The drive system according to claim 14 wherein the system controller is capable of acquiring operational parameters or settings from individual electric motors via the communication line.

17. The drive system according to claim 13, wherein the communication line is a serial communication line that transmits addresses and commands over the same data line, and the identification codes of the electric motors are associated on a one-to-one basis with addresses of the electric motors transmitted by the system controller via the communication line, whereby the addresses of the electric motors function as identification codes of the electric motors.

18. The drive system according to claim 13 wherein the system controller is capable of acquiring operational parameters or settings from individual electric motors via the communication line.

19. The drive system according to claim 8, wherein the communication line is a serial communication line that transmits addresses and commands over the same data line, and the identification codes of the electric motors are associated on a one-to-one basis with addresses of the electric motors transmitted by the system controller via the communication line, whereby the addresses of the electric motors function as identification codes of the electric motors.

20. The drive system according to claim 8, wherein the system controller is capable of acquiring operational parameters or settings from individual electric motors via the communication line.

21. The drive system according to claim 7, wherein the communication line is a serial communication line that transmits addresses and commands over the same data line, and the identification codes of the electric motors are associated on a one-to-one basis with addresses of the electric motors transmitted by the system controller via the communication line, whereby the addresses of the electric motors function as identification codes of the electric motors.

22. The drive system according to claim 21, wherein the system controller is capable of acquiring operational parameters or settings from individual electric motors via the communication line.

23. The drive system according claim 7, wherein the system controller is capable of acquiring operational parameters or settings from individual electric motors via the communication line.

24. A method of controlling a drive system having a plurality of electric motors each including a coil array having a plurality of magnetic coils; a magnet array having a plurality of permanent magnets; a plurality of magnetic sensors each outputting an output signal that changes in analog fashion depending on relative location of the magnet array and the coil array; a drive control circuit that, utilizing analog change in the output signals of the plurality of magnetic sensors, generates application voltage for application to the coil array; and an output waveform correcting unit configured to respectively correct waveforms of the output signals of the plurality of magnetic sensors such that the output signals of the magnetic sensors assume a prescribed waveform shape during operation of the electric motors; wherein the output waveform correcting unit has a memory for storing output waveform correction values, ID codes are assigned respectively to the plurality of magnetic sensors, and the output waveform correcting unit receives from an external device an output waveform correction value for each magnetic sensor, together with the ID code for each magnetic sensor, and stores the output waveform correction value for each magnetic sensor in the memory, and a system controller coupled to the plurality of electric motors via a shared communication line, comprising the steps of:

establishing in the drive control circuit of each electric motor an identification code for identifying each electric motor; and controlling operation of individual electric motors by transmitting commands together with the identification codes, from the system controller to individual electric motors via the communication line.

* * * * *